(12) United States Patent
Simpson et al.

(10) Patent No.: US 8,239,526 B2
(45) Date of Patent: Aug. 7, 2012

(54) SYSTEM AND METHOD FOR PERFORMANCE DATA COLLECTION IN A VIRTUAL ENVIRONMENT

(75) Inventors: Franklin Fulton Simpson, New Impswich, NH (US); John Herendeen, Upton, MA (US); Richard P. Mousseau, Stratham, NH (US); Codanda G. Chinnappa, Marblehead, MA (US)

(73) Assignee: Oracle International Corporation, Redwood Shores, CA (US)

( * ) Notice: Subject to any disclaimer, the term of this patent is extended or adjusted under 35 U.S.C. 154(b) by 72 days.

(21) Appl. No.: 12/618,571

(22) Filed: Nov. 13, 2009

(65) Prior Publication Data
US 2010/0125665 A1  May 20, 2010

Related U.S. Application Data

(60) Provisional application No. 61/114,763, filed on Nov. 14, 2008.

(51) Int. Cl.
*G06F 15/173* (2006.01)
(52) U.S. Cl. ....................................................... 709/224
(58) Field of Classification Search .......... 709/223–226; 718/100–108
See application file for complete search history.

(56) References Cited

U.S. PATENT DOCUMENTS

| 2002/0013802 A1* | 1/2002 | Mori et al. ........................ 709/1 |
| 2005/0108709 A1* | 5/2005 | Sciandra et al. .................. 718/1 |
| 2005/0216488 A1* | 9/2005 | Petrov et al. ................... 707/100 |
| 2005/0216585 A1* | 9/2005 | Todorova et al. ............. 709/224 |
| 2007/0043860 A1* | 2/2007 | Pabari .......................... 709/224 |
| 2008/0155153 A1* | 6/2008 | Yoshii et al. .................. 710/262 |
| 2009/0199177 A1* | 8/2009 | Edwards et al. ................. 718/1 |

* cited by examiner

*Primary Examiner* — Brendan Higa
(74) *Attorney, Agent, or Firm* — Fliesler Meyer LLP

(57) ABSTRACT

A system and method can deploy and manage software services in virtualized and non-virtualized environments. The system provides a data consumer that manages a plurality of data collectors, wherein each data collector resides on one of the plurality of virtualized and non-virtualized machines in the computing environment and extracts performance data from a set of Virtual Machines running on a specific compute resource using an operating contract. The operating contract includes one or more metric descriptors, wherein each metric descriptor specifies one or more resources associated with the set of Virtual Machines. In addition, a push manager allows the data consumer to register performance data items that need to be handled, wherein the push manager calls the data consumer to process the performance data items at each time the periodic interval elapse.

15 Claims, 15 Drawing Sheets

Figure 7

SYSTEM AND METHOD FOR PERFORMANCE DATA COLLECTION IN A VIRTUAL ENVIRONMENT

CLAIM TO PRIORITY

This application claims priority to U.S. Provisional Application No. 61/114,763, filed Nov. 14, 2008, entitled "System and Method for Performance Data Collection in a Virtual Environment," which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates generally to application servers and the providing of application services in an enterprise environment, and, particularly, to a system and method for deploying and managing software services in virtualized and non-virtualized environments.

BACKGROUND

Organizations that utilize enterprise and application server software as part of their enterprise infrastructure are increasingly adopting virtualization technologies as part of their drive to increase utilization and reduce infrastructure costs, while at the same time improving their ability to respond rapidly to a new line of business initiatives.

Hypervisor-based virtualization platforms allow the organization to consolidate their information technology deployments onto a much reduced number of servers running powerful multi-core processors, which in turn host multiple virtual machines running applications in their own protected, virtualized environments. As a result, organizations have been able to optimize their physical infrastructure by pooling hardware and storage resources, reduce physical space, ease power and cooling costs, and improve application availability.

Recently, the focus has shifted to application virtualization—technologies that help information technology operations to package, deploy, monitor and control enterprise applications in these new virtual data centers to achieve flexible, dynamic operations that are more responsive, highly available and efficient. This is the area that embodiments of the present invention are designed to address.

SUMMARY

A system and method can deploy and manage software services in virtualized and non-virtualized environments. The system provides a data consumer that manages a plurality of data collectors, wherein each data collector resides on one of the plurality of virtualized and non-virtualized machines in the computing environment and extracts performance data from a set of Virtual Machines running on a specific compute resource using an operating contract. The operating contract includes one or more metric descriptors, wherein each metric descriptor specifies one or more resources associated with the set of Virtual Machines. In addition, a push manager allows the data consumer to register performance data items that need to be handled, wherein the push manager calls the data consumer to process the performance data items at each time the periodic interval elapses.

BRIEF DESCRIPTION OF THE FIGURES

FIG. 7 is an illustration that shows another screenshot of an Administrative Console interface that allows for setting of filters, in accordance with an embodiment.

DETAILED DESCRIPTION

Figure 1:
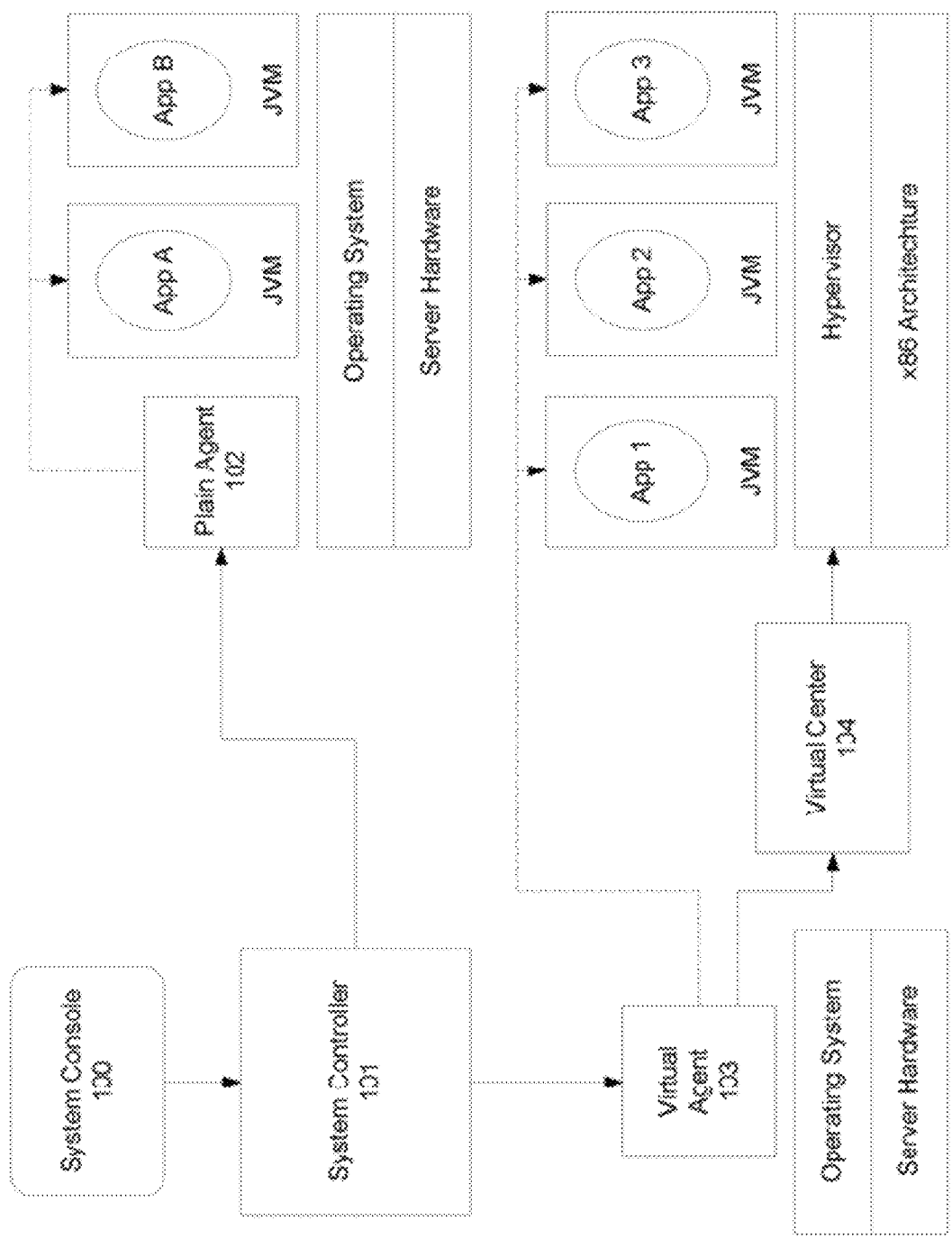
FIG. 1 is an illustration that shows the architecture of a system for deploying and managing software services, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses WebLogic® application server functions or libraries as an example for application server functions or libraries. It will be apparent to those skilled in the art that other types of application server functions or libraries can be used without limitation.

The description of the invention as following also uses Java® Virtual Machine functions or libraries as an example for virtual machine functions or libraries. It will be apparent to those skilled in the art that other types of virtual machine functions or libraries can be used without limitation.

In accordance with an embodiment, the system provides an enterprise application virtualization solution that allows for centralized governance and control over software and Java applications. Operation teams can define policies, based on application-level service level agreements (SLA) that govern the allocation of hardware and software resources to ensure that quality of service (QoS) goals are met across virtual and non-virtualized platforms. When pre-defined conditions occur, a controller dynamically apportions resources to applications or services by invoking the deployment capabilities of the underlying infrastructure. This allows organizations to take advantage of the computing power available from modern processing systems and hypervisor-based virtualization technology. Applications can be deployed on a pool of virtual resources and dynamically extended or re-configured to meet runtime requirements, without constant monitoring by system operators.

In accordance with an embodiment, application administrators can set policies that govern such features as how many servers must be available in a given domain, the maximum load that those servers should support, the response time required for individual services, and other important Service Level Agreement (SLA) metrics. If any of these parameters are breached, the system can respond immediately by provisioning further server instances, migrating existing instances to more suitable resources, or taking other actions to reconfigure the application's runtime environment.

In accordance with an embodiment, the system automatically maps application activity to the most appropriate resources of the underlying platform, so that in a virtualized environment the system can invoke hypervisor-based services to clone, deploy or to migrate servers; while in a non-virtualized operating system (OS)-based environment, the system can start additional resources wherever they have been defined. The system can also provide application-level monitoring and automation for all Java® applications, whether those applications are running virtualized or on a dedicated server. In a typical organization, the information operations can contain a mixture of virtual and dedicated servers (since not all applications can be effectively virtualized and in some cases a mixed architecture may be appropriate). Using the system herein, an organization is able to control and optimize Java applications both at the Java® Virtual Machine (JVM) and application server layers, regardless of how and where those applications are running.

In accordance with an embodiment, the system comprises two principal components: a Controller, and one or more Agents. The Controller maintains a secure repository of service deployments and SLA policies that are monitored by the system, with a high-performance customizable rules engine that allows the system administrator to specify what actions should be taken when those service levels are at risk. The Controller monitors JVM, application and other metrics, and is able to perform configuration changes and provide process control, so that operations teams can automate key tasks aimed at maintaining application quality of service (QoS), such as provisioning new server instances or migrating existing deployments to alternative hardware resources, based on the runtime behavior of applications and the SOA services that underpin them. The Controller can determine optimal resource placement for service deployments and JVM creations by matching service deployment requirements with specific resource pool capabilities. Action pipelines can be defined to allow complex, sequenced activities to be initiated in response to an event or condition and calendar-based rules allow scheduling of actions to be performed on a one-off or periodic basis.

Agents manage the virtualized or non-virtualized resources that make up the application domain to be managed. These can be virtual appliances (for example, WLS-VE) running on hypervisor-based virtualization platforms, dedicated app server, or JVM-based deployments. Agents determine the resource capabilities of the managed resource environment, and provide appropriate process control operations and platform-specific runtime information. Agents collect and aggregate a rich variety of information about the resources and services they monitor, which they return to the Controller.

The Controller and Agents can run within virtual machines, or on dedicated servers. For example, in some embodiments the Controller can run on its own, dedicated server, as can the Virtualized Agent which manages the server instances running in virtual machines on the hypervisor. Virtualized server resources, process control and virtual machine monitoring can be performed via API calls. Both virtualized and non-virtualized resources can be controlled in a single domain. In accordance with a particular embodiment, the system and features thereof are referred to as a Liquid Operations Control (LOC) system. These and other features and benefits are described in further detail below.

Glossary

The following terms are used throughout this document:

Controller—A centralized component or process that gathers data about the operating environment from Agents. The Controller uses the data gathered to enforce policies and to deploy new services in a way that best honors the SLA of all deployed services. The Controller hosts the Administration Console.

Agent—A component or process that provides information about the environment to the Controller, starts and stops processes, and invokes other actions at the request of the Controller. In accordance with an embodiment, the system can use two types of Agents: a Plain Agent for managing any type of Java process, that renders the resources from the machine on which it resides as a resource pool; and a Virtualized Agent for managing instances of Application Server running in a virtualized environment, that renders the virtualized resource pools as system-accessible resource pools, and can reside on any machine in the operations center that has access to the virtualized environment.

Administration Console—A graphical user interface that an administrator can use to configure, manage, and monitor services in the operations center.

Managed Java Process—A process instance initiated by the system and then monitored.

Action—A software class that can display alert messages in the Administration Console, send notifications, or change the runtime state of a service. Actions can be adjudicated, requiring user input before the system invokes the action pipeline. Actions can be invoked by the Controller as part of enforcing a policy, or manually from the Administration Console.

CPU cycles/Computer Power—A measurement of the CPU resources that a resource pool can supply and that a service needs. The measurement can be normalized across CPU architectures so that a megahertz of processing on an i386 processor is comparable to a megahertz on other types of processors.

Hypervisor—Virtualization software that allows multiple operating systems to run on a single physical computer at the same time.

JMS—Java Message Service.

JMX—Java Management Extensions.

JVM—Java Virtual Machine.

Managed Environment/LOC environment—The collection of all resource pools, services, processes, Agents and Controller in a single installation at an organization.

Machine/Server—Either a physical machine or a virtual machine.

Metric—A numeric runtime value that describes the performance of a process or process group and the resource environment. Some metrics are aggregations or calculations of raw (observed) data. Policies set constraints on metrics.

Physical Host—The physical machine that is hosting a Controller, an Agent or any of the processes that the system is managing, including virtual machines that the system has started.

Policies—Runtime requirements for a service and actions to take when the service operates outside the requirements. In accordance with an embodiment, each policy comprises two parts: a single constraint and an action or pipeline of actions. Multiple policies can be created for each service. Policies can apply to the resource environment, all processes in a service, to a group of processes (process type), or to a single process.

Process/Application—A program that the system manages. For example, a single application server managed server can be considered a process. From the perspective of the system, a Java process consists of an entire JVM stack and includes any application server and applications being managed.

Process Group/Process Type—A collection of processes in a service for which policies can be written. For example, a process group can contain three application server instances, and a policy can be written that starts all three server instances when the service is deployed.

Resource Pool/Computer Resource—A virtual environment, or a physical environment, in which services can be deployed. Each resource pool provides access to physical computing resources (such as CPU cycles, memory, and disk space) and pre-installed software that a service needs to run. A resource pool also contains a description of the failover capabilities of the machines that host the computing and software resources.

Service/Application—A collection of one or more processes that the system manages as a unit. Each process in a service is a software stack starting from the Java Virtual Machine (JVM) and including the classes that are running in the JVM. For example, in some embodiments a service can be created for managing a single application server instance on which is deployed a single Java EE application. Alternatively, a service can be created for managing all server instances in a cluster. In accordance with an embodiment, a service specifies requirements for the physical computing resources that are needed to run all of its processes, expressed as a range of CPU cycles, memory, and disk space, an optional set of policies that define an SLA, and actions to take when the service is operating outside of the SLA. Metadata can also be provided that defines the Java classes or other executables that comprise the service processes.

System Environment

In accordance with an embodiment, a system is provided which includes a management framework for virtualized and non-virtualized enterprise Java applications. A layer of abstraction is provided over complex operation environments that enable operation staff to think in terms of supply and demand. The framework also offers a policy-based framework for creating and automatically enforcing service level agreements for Java applications, and allows the system to monitor resources across the operations center and distribute the deployment of Java applications in a manner that ensures the overall efficient use of resources.

On the demand side, the system can be used to organize Java applications (processes) into services. Typically, a group of related processes are organized into a single service and the group is then managed as a unit. Alternatively, one service can be created for each process. On the supply side, the system can be used to organize the computer resources in an operations center into collections of resources, or resource pools. A resource pool can represent a single physical machine or a collection of virtualized resources that are made available through Hypervisor software. In accordance with an embodiment, the system provides an environment for encapsulating an SLA as a collection of requirements and policies. The operation team can define policies based on application-level SLA that govern the allocation of hardware and software resources, ensuring that quality of service (QoS) goals are met across virtual and non-virtualized platforms.

FIG. 1 is an illustration that shows the architecture of a system for deploying and managing software services, in accordance with an embodiment. As shown in FIG. 1, a typical deployment contains a single Controller 101, and multiple Agents 102 and 103 that manage and monitor resources and communicate that information back to the Controller 101. The Controller 101 gathers data about the operating environment from the Agents 102 and 103. The Controller 101 then uses the data gathered to intelligently deploy new services and to evaluate and enforce policies to honor the SLA for all services in the environment. The Controller 101 also hosts the Administration Console 100 that enables an administrator to visually configure, manage, and monitor the environment.

When predefined conditions occur, the system dynamically allocates resources to services. The system then monitors the use of resources across the operations center and distributes the deployment of Java® applications in a manner that ensures the most efficient use of resources overall. When a service is deployed, or when a system action requests that an additional process be started, the system examines all resource pools to determine where to host the service or process. To choose a resource pool, the system first eliminates any resource pool that cannot satisfy particular dependencies (such as IP addresses or access to software. For example, if a service requires access to Application Server software, then the system eliminates any resource pools that cannot provide access to Application Server software). After considering declared dependencies, the system then considers the capacity of each remaining resource pool, the SLA of any services that are currently deployed, and the relative priorities declared for each service. It then uses an appropriate algorithm to determine which resource pool to use.

One example is based on most resources available. In this approach the system chooses the resource pool that currently has the most excess capacity. For example, if resource pool A has 600 MHz of CPU and 600 MB of RAM that are currently unused, and resource pool B has 400 MHz of CPU and 400 MB of RAM that are unused, then the system chooses resource pool A.

Another example is based on most efficient use of resources. In this approach, the system chooses the resource pool that has just enough unused resources to satisfy the minimum resource requirements of a deployment request. This algorithm ensures the system is best positioned to handle services whose resource requirements are larger than the current request. For example, if resource pool A has 600 MHz of CPU and 600 MB of RAM that are currently unused, and resource pool B has 400 MHz of CPU and 400 MB of RAM that are unused, and if a service is deployed with a minimal requirement of 200 MHz of CPU and 200 MB of RAM, then the system chooses resource pool B.

System Controller

Figure 2:
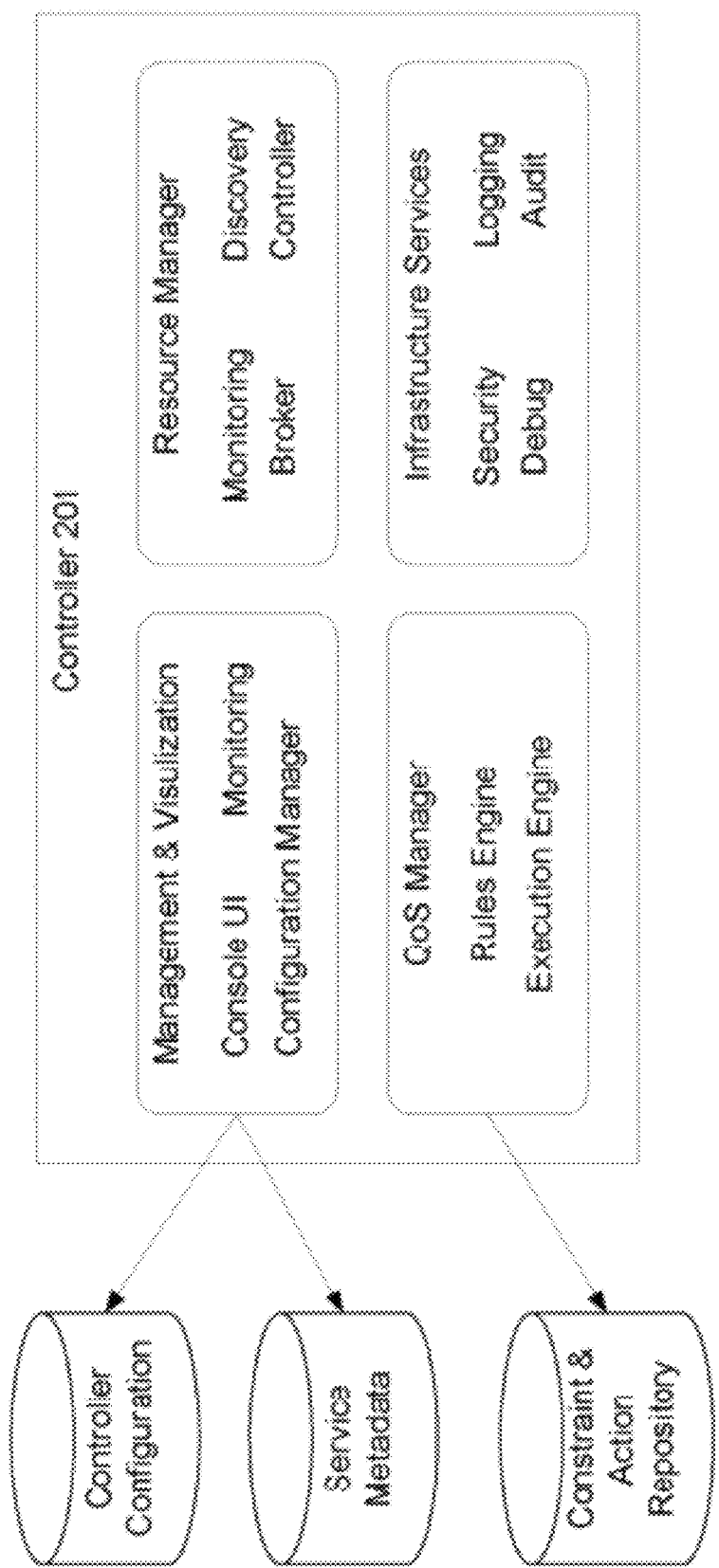
FIG. 2 is an illustration that shows the architecture of a Controller for use with the system, in accordance with an embodiment.

FIG. 2 is an illustration that shows the architecture of a Controller 201 for use with the system, in accordance with an embodiment. Each instance of the system environment includes a single Controller 201. The Controller 201 is responsible for hosting the Administration Console that enables the administrator to visually configure, manage, and monitor the environment; managing resource pools; managing the creation of services; managing the creation of SLA agreements; and, providing logging and audit trails.

To manage resource pools, the Controller communicates with Agents to determine the computing resources that each Agent is capable of allocating and selects appropriate resource pools for deploying services. To adapt the system environment to best meet the SLA of all deployed services, the Controller communicates with Agents to gather metrics. It also compares policy constraints against the metrics and invokes actions when services operate outside the constraints. The Controller configuration, service metadata, and SLA information are stored as XML files and stored locally on the machine that is hosting the Controller.

System Agents

Figure 3:
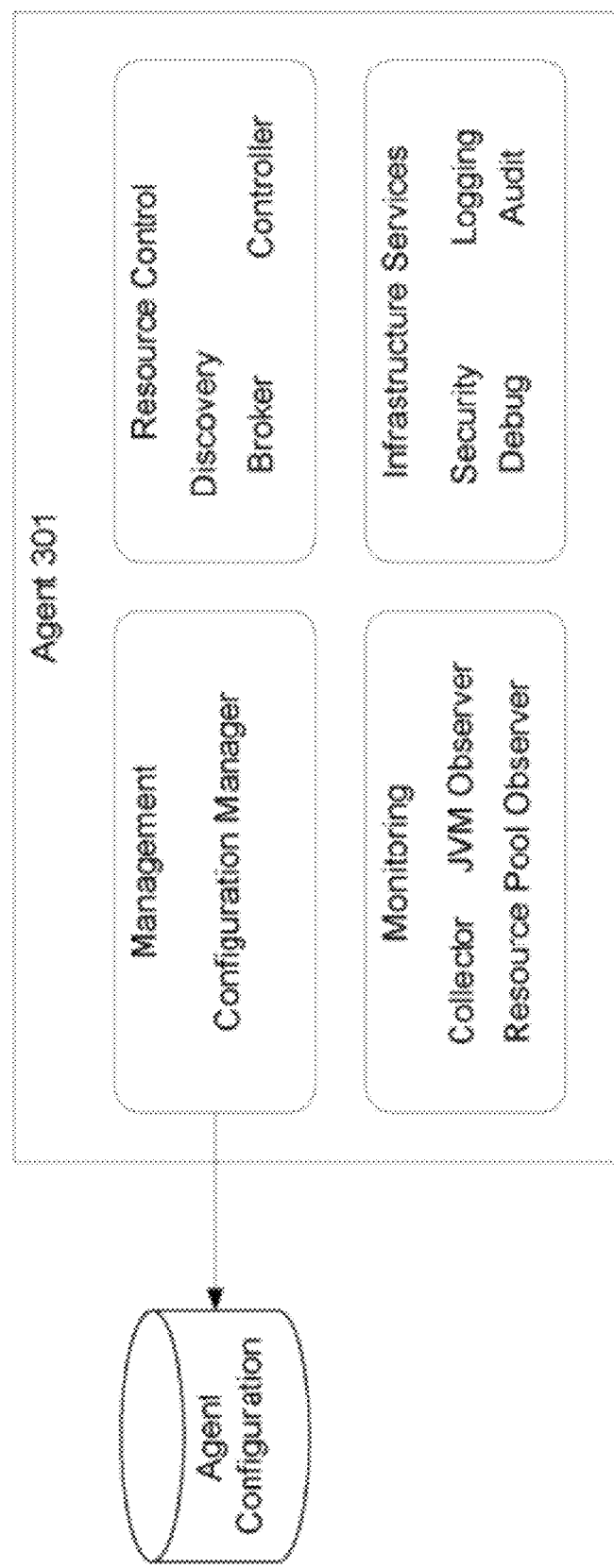
FIG. 3 is an illustration that shows the architecture of an Agent for use with the system, in accordance with an embodiment.

FIG. 3 is an illustration that shows the architecture of an Agent 301 for use with the system. In accordance with an embodiment, an Agent 301 is a standalone Java process that renders the CPU cycles and memory of a machine or a collection of virtual resources as resource pools for use by services. As described above, in accordance with an embodiment, the system supports two types of Agents: a Plain Agent for managing any type of Java process, and that renders the resources from the machine on which it resides as a resource pool; and, a Virtualized Agent for managing instances of Application Server running in a virtualized environment, and that renders virtualized resource pools as system resource pools. Agents can use XML documents to save information about the resources that the Agent exposes for use by the system. Agents can also use unique identifiers for each of the managed processes being managed by that Agent.

In accordance with an embodiment, a Virtualized Agent can communicate with the Virtual Center or similar process, to gather data about the resource pools that are available for use by the system and to manage instances of Application Server. After an Application Server instance starts, the Agent communicates with the Application Server instance to gather monitoring data and invoke management actions.

In accordance with an embodiment, each instance of the system environment includes one or more Agents 301. The one or more Agents 301 is responsible for managing and storing its configuration information; providing ongoing visibility into the amount of resources that the system is using for a given resource pool; controlling the life cycle of JVMs in a resource pool upon request from the Controller; gathering metrics and monitoring data of its instantiated JVMs and making this data available to the Controller; and, providing logging and audit trails.

Administration Console

Figure 4:
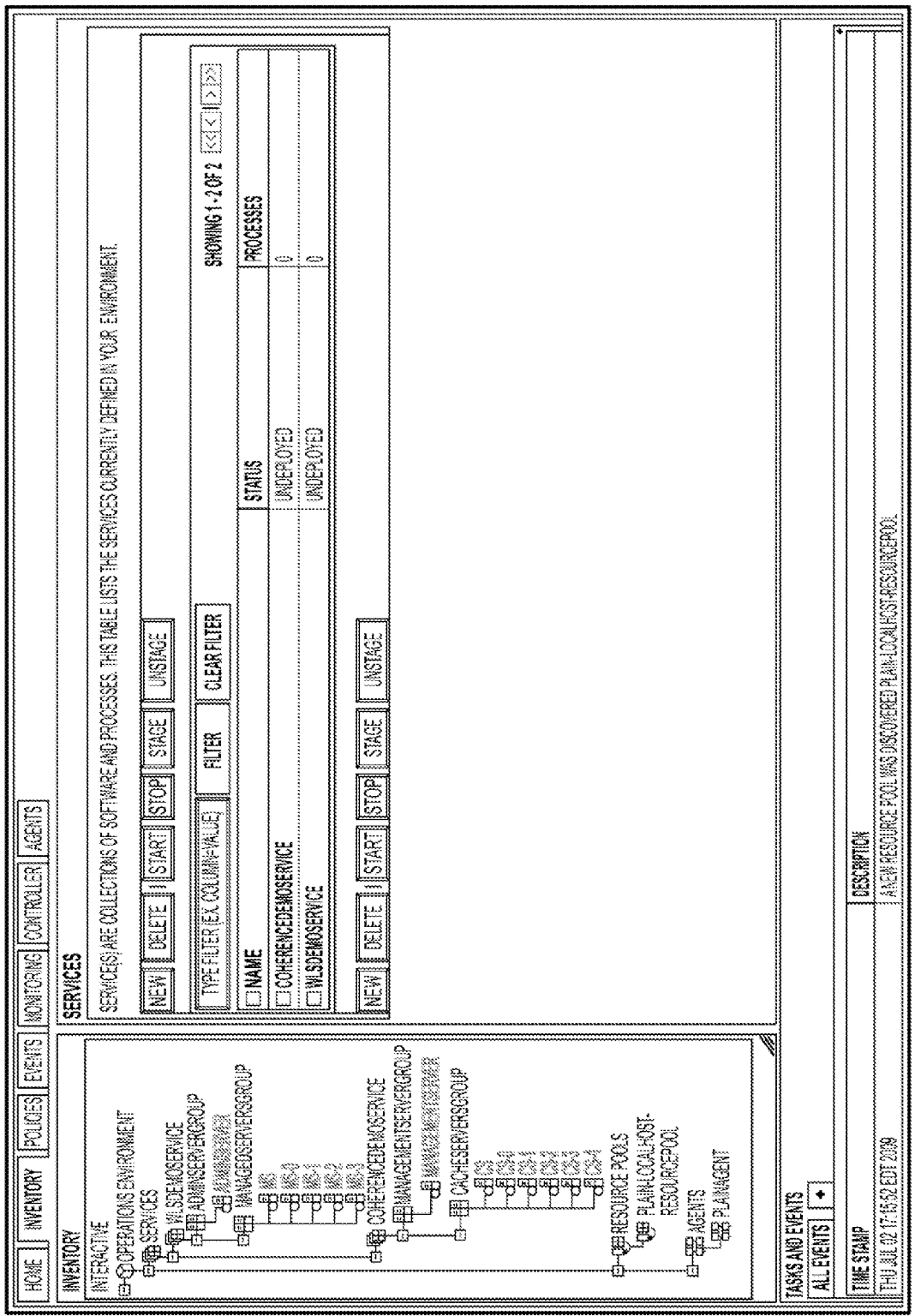
FIG. 4 is an illustration that shows a screenshot of an Administrative Console or interface, in accordance with an embodiment.

FIG. 4 is an illustration that shows a screenshot of an Administrative Console or interface. In accordance with an embodiment the Administration Console is a browser-based, graphical user interface that the administrator can use to configure, manage, and monitor services in the operations center. The interface can be hosted by the Controller, which communicates with Agents to gather monitoring data and to invoke management actions.

In one embodiment, the Administration Console can configure network communications for Controllers and Agents; organize computing resources into resource pools; organize Java applications into services; create policies to enforce SLA for services automatically; configure logging and auditing features; create users and assign them to groups and roles; deploy and activate services; invoke actions to manually affect services; monitor the performance of services; monitor the use of computing resources on machines that host resource pools; and, view Controller log files and security auditing files.

Administration Console and Configuration of Services

Figure 5:
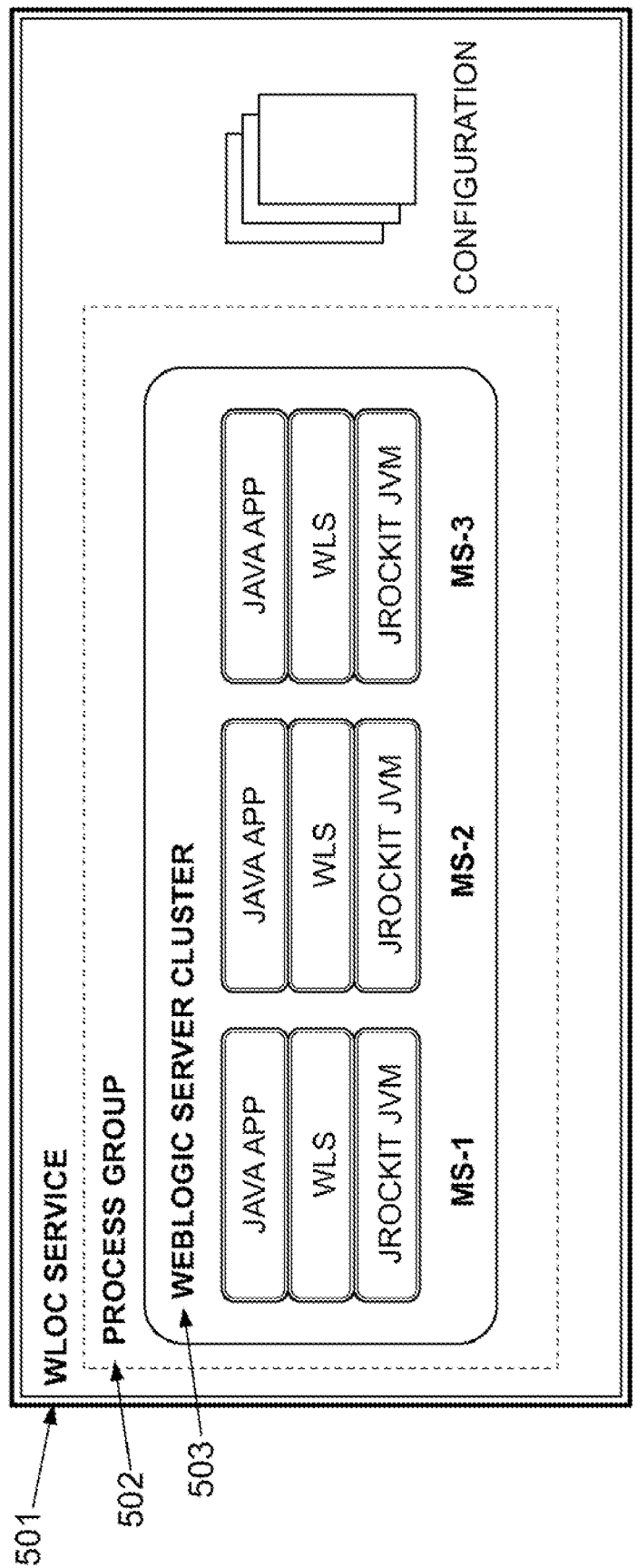
FIG. 5 is an illustration that shows the architecture of a system for deploying and managing software services as process groups and clusters, in accordance with an embodiment.

FIG. 5 is an illustration that shows the architecture of a system for deploying and managing software services as process groups and clusters, in accordance with an embodiment. A service is a collection of one or more processes that the system manages as a unit. Each process in a service is a software stack starting from the Java Virtual Machine (JVM), including the classes that are running in the JVM. Typically, processes that perform the same function are organized into process groups. (For example, all of the servers in a cluster can be organized within a process group). The administrator can specify attributes for each process group such as:

The number of instances of the process groups to create initially and the minimum and maximum number of process instances allowed for the service;

The minimum amount of resources that the process requires and an upper limit of resources that the process can use. The system reserves the minimal resources for exclusive use by the process and grants additional resources if they are available;

A priority for the service, which the system uses to resolve conflicts when more than one service fails to meet its SLA at the same time;

Any information required by the system in order to deploy processes, including the main class, JVM startup arguments, and software dependencies;

A ready metric, which the system uses to determine when a process has been successfully started and can be monitored; and Any software dependencies including the name and location of the software that the processes require to run.

The administrator can also define one or more policies that specify the deployment or runtime requirements (constraints) for the service and the actions to take if the SLA constraint is not met. For example, a policy can be used to expand or shrink a service's footprint in response to the runtime environment. Constraints can be placed on a process, a group of processes, or all processes in a service. In accordance with an embodiment, constraints can be based on a calendar value, or, if the managed processes expose management data through Java Management Extensions (JMX), then by constraining the value of an MBean attribute in the processes.

For example, in FIG. 5, an administrator can create a service 501 that specifies a process group 502 for a collection of externally-facing web services, all of which run on a single application server cluster 503, and can configure the process group 502 as follows:

Resource Minimum=Reserve 400 CPU cycles, 600 MB RAM.

Resource Maximum=Allow services to use up to 800 CPU cycles, 800 MB RAM.

Resource Priority=Specify highest priority over all other services.

Initial Deployment State=Start Administration Server and two Managed Servers.

For example, a policy can be created that starts an additional cluster member during business hours. A second policy can be created that starts two additional members if servlet response time drops below 2 seconds, and that stops the additional members if response time is faster than 0.1 second. When the service is deployed, the system reserves the prescribed 400 CPU cycles and 600 MB of RAM for exclusive use by the service. As the system adds processes to the service, it requests additional resources for use by the service up to the maximum. If the additional resources are currently being used by other processes, the system can remove resources from lower-priority processes, as long as each process retains its minimal reserve.

Administration Console and Monitoring of Services and System Resources

Figure 6:
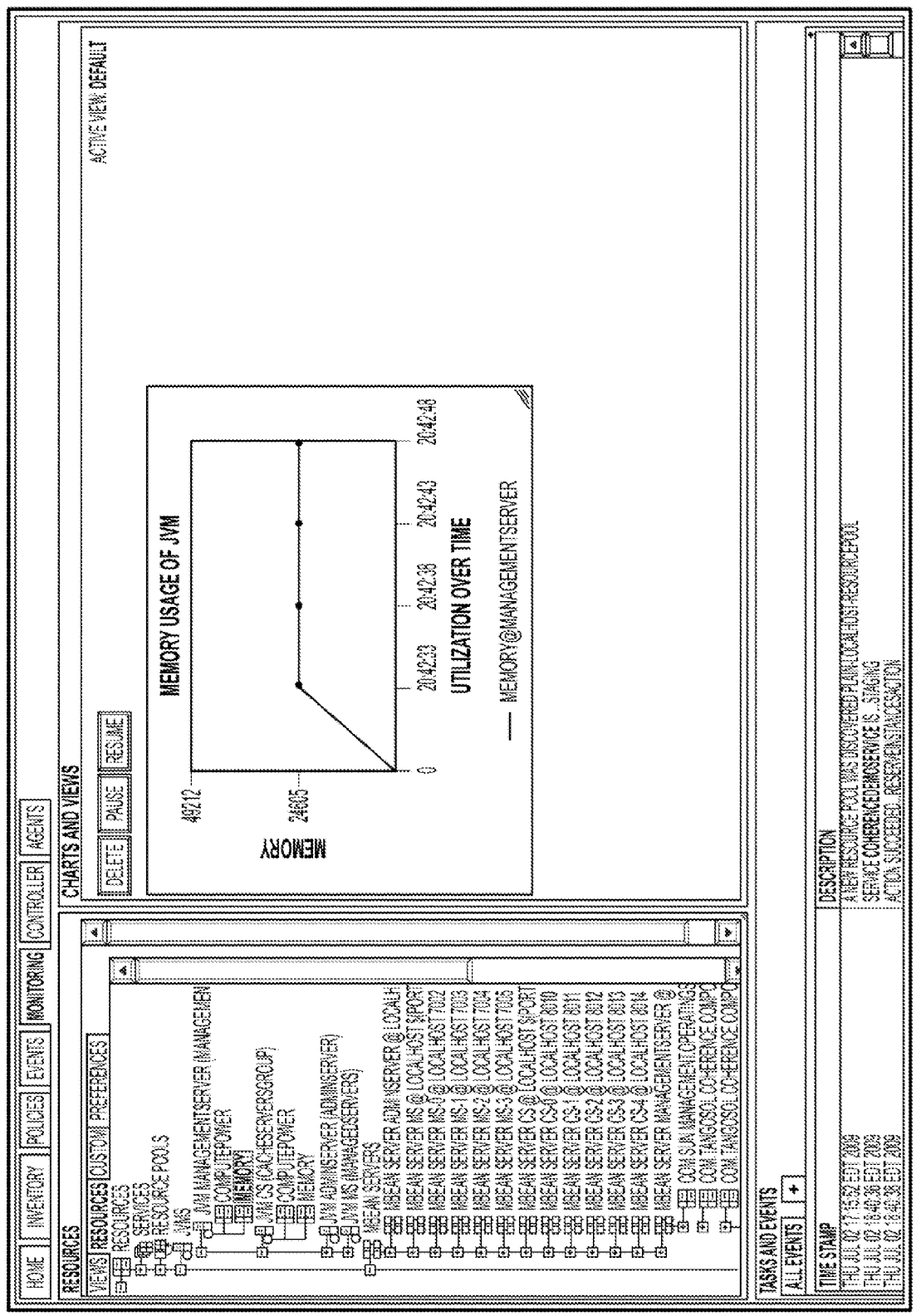
FIG. 6 is an illustration that shows another screenshot of an Administrative Console interface that displays metrics, in accordance with an embodiment.

FIG. 6 is an illustration that shows another screenshot of an Administrative Console interface that displays metrics, in accordance with an embodiment. The performance of system resources can be charted using charts and graphs that describe the amount of resources the service is using from a resource pool relative to the amount of resources available, and the runtime statistics from each JVM within the service.

In accordance with an embodiment, services and system resources can be monitored based on:

Information about events and action that have occurred in the environment and the time that they occurred;

Actions that are currently pending and that require approval;

Notifications that are triggered when a service operates outside of a policy constraint. The administrator can configure the system to generate notifications using Java Message Service (JMS), Java Management Extensions (JMX), Simple Mail Transfer Protocol (SMTP), and Simple Network Management Protocol (SNMP);

Log messages about events such as the deployment of services or the failure of one or more actions; and Audit messages that capture changes to the Controller, Agents, or service configuration.

Administration Console and Security

Figure 7:
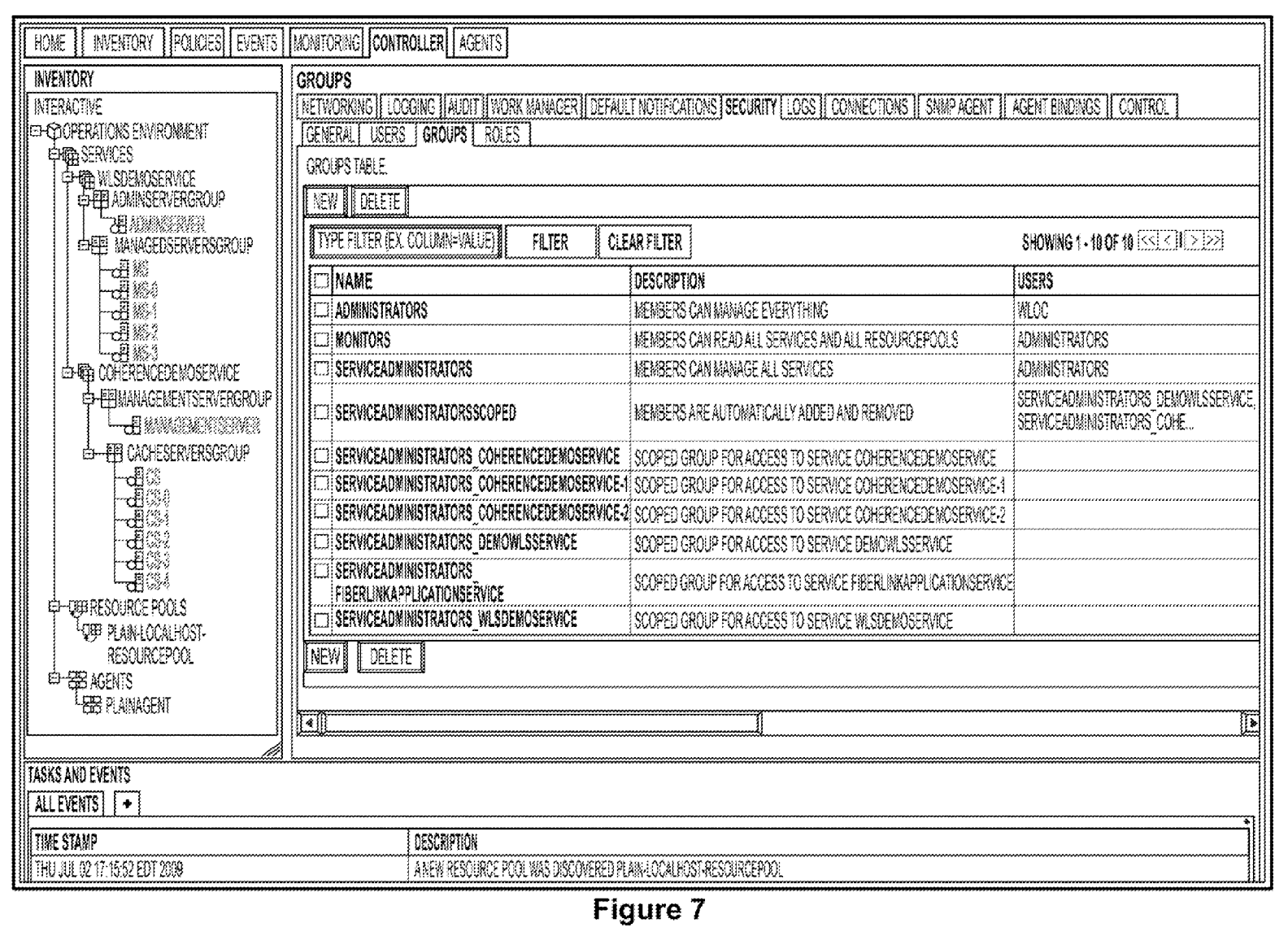

FIG. 7 is an illustration that shows another screenshot of an Administrative Console interface that allows for setting of filters. In accordance with an embodiment, the system uses role-based access control to enable an administrator to assign different levels of privileges to different users or groups. The system also includes a set of security roles with pre-configured access privileges, and groups that can be configured to be in one or more of the defined security roles. An administrator can then create users and assign them to groups, or directly to security roles.

System Performance Data Collection

There can be two data collection mechanisms in a virtualized environment: Observers and Harvesters. Both Observers and Harvesters can collect metric data related to the system performance and provide the collected metric data to data consumers such as a System Controller in a virtualized environment.

In one embodiment, both the Observer and Harvester can gather requested metric data from a data resource and use lists of metric descriptors to specify the metrics, including using individual sample periods per metric and wildcards in the metric description. Also, both the Observer and Harvester can export the same logical set of metadata about the domain they are collecting from and support one-time retrieval of metric information without first registering the lists. The metric information is comprised of the same basic information: type name, instance name, attribute name, and sample period. Also, both the Observer and Harvester support a push (callback) model and a pull model. In addition, both the Observer and Harvester are sharable by their users, can handle multiple overlapping lists of metrics per client and support reporting of validation and runtime errors.

In one embodiment, Observers and Harvesters use different formats to return values. The Observer model supports optimized web-service interfaces and the push model. On the other hand, Harvesters can only be accessed within a process.

Figure 8A:
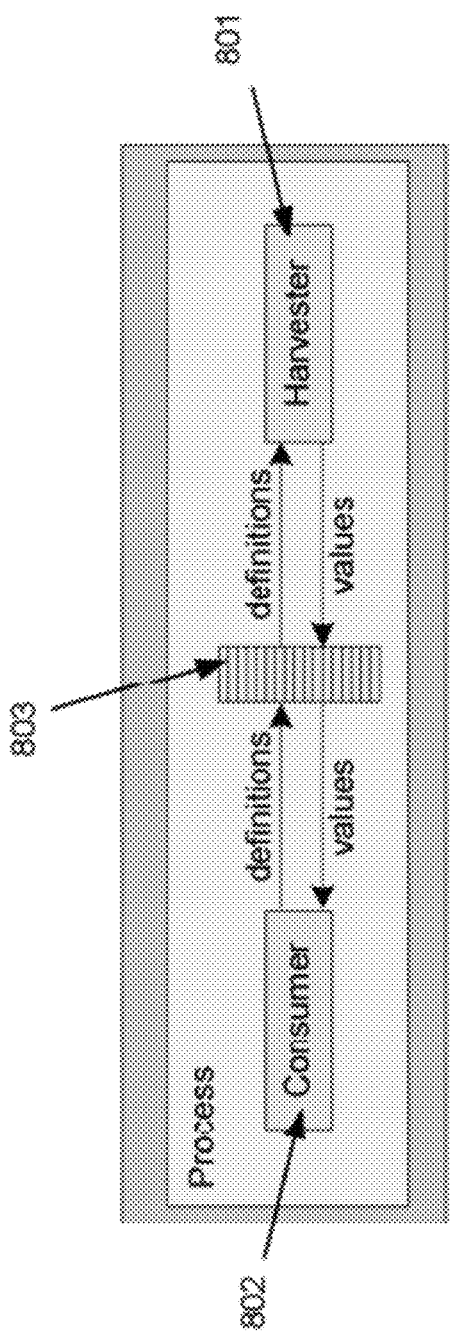
FIG. 8A is an illustration that shows a Harvester model in a virtual environment, in accordance with an embodiment.

As shown in FIG. 8A, the Harvester 801 models all communication (except metadata queries) with a data consumer 802 through a common shared data structure 803. The data structure 803 describes the metrics to be collected and can also return the metric values. Timestamps are used to designate which values are new, and which are stale. This model is very efficient when moving data in-process, since this model does not involve data copying, object instantiation, or parsing in any form. There is also no cost in returning values, whether they have changed or not.

Figure 8B:
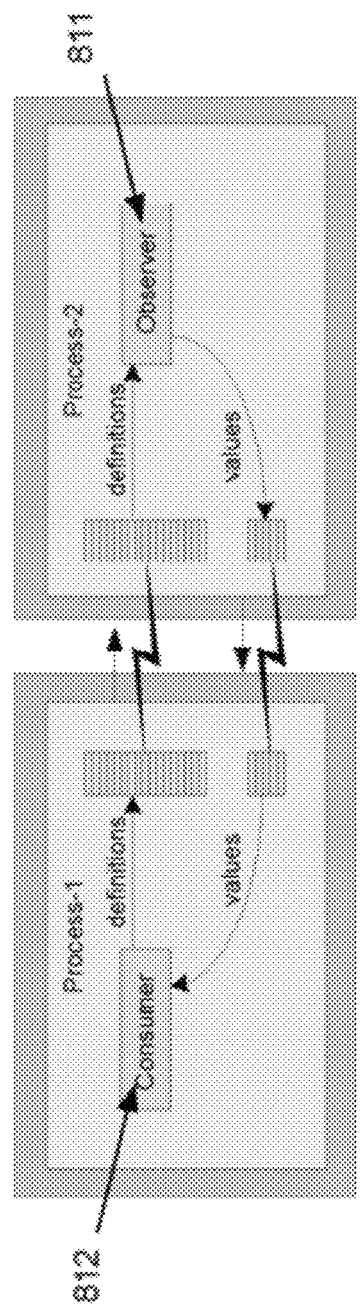
FIG. 8B is an illustration that shows an Observer model in a virtual environment, in accordance with an embodiment.

In another embodiment, as shown in FIG. 8B, the Observer 811 model can transfer the returned values remotely for a data consumer 812. The Observer 811 can be designed to limit the amount of data that is transferred. The Observer 811 uses a more complex data structure. The data structure is used to communicate what metrics are to be collected, while values are returned in a list of separate objects that are optimized to encode strings in an efficient way.

Harvester

A Harvester is a functional component that extracts data from a resource. A resource can potentially take many forms. For example, the resource can be a java process, a non Java process, or a data store. In one embodiment, there can be many Harvesters, and a Harvester domain describes the set of available Harvesters.

Figure 9:
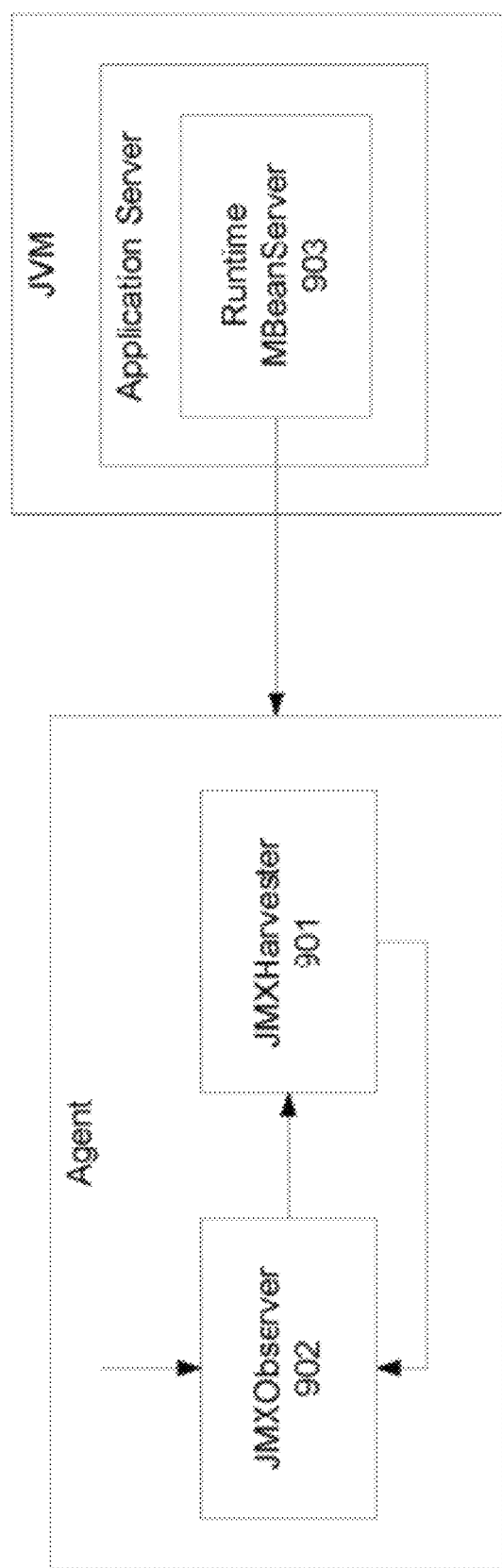
FIG. 9 is an illustration of a JMX Harvester in a virtual environment, in accordance with one embodiment.

In one embodiment, a JMX Harvester collects metric data from MBeans. In addition, while a Harvester is accessed locally, the Harvester is capable of collecting the data from a remote source. For example, the JMX Harvester can use a remote connection to the MBeanServer. The JMX Harvester collects and distributes information represented by MBeans in an MBeanServer. The JMX Harvester can also collect metrics using a Harvester API. In addition, Metric values can be obtained using the JMX API. For example, as shown in FIG. 9, the JMX Harvester 901 sits between the JMX Observer 902 and the Runtime MBeanServer 903 of an Application Server.

In one embodiment, the Harvester implements the Generic Harvester Contract (GHC), which allows a single Harvester to be used by different consumers, and allows a Harvester to manage different types of resources.

In another embodiment, Harvesters can manage diverse types of resources. Therefore, for any consumer, a number of different Harvesters can be presented, while each provides information about the resources that they service. A Generic Harvester Contract (GHC) can standardize access to the resources each Harvester manages. In this way, the process of monitoring diverse resources can be reduced to interfacing to one or more Harvesters through a standard protocol. Specific differences among resource types are handled by the individual Harvesters and, thus, are hidden from the consumer. Existence of the Generic Harvester Contract (GHC) also facilitates sharing the same Harvesters among different consumer types.

There are two main entity types in the Generic Harvester Contract (GHC). One is the Metric descriptor (MD) which is a description for a metric, or if wildcards are used, for a set of metrics. Each metric descriptor specifies a resource (or resources) and an attribute on those resources. Another is the Watched Value (WV) that is a collection of metric identifiers. Initially, consumers provide a Watched Value (WV) to a Harvester in order to specify what metrics are to be monitored. Then, on an ongoing basis, observed values are returned through the Watched Values (WVs). In one example, after they are consummated by the Harvester, MDs and WVs are each identified by their own numeric identifier. The use of identifiers increases performance by avoiding String comparisons. Also, a Harvester or consumer implementation can use these IDs as indices into an ordered list of structures, thereby improving lookup times.

In an embodiment, an identifier for a Watched Value (WV) is called a Watched Value ID (WVID) and an identifier for a Metric descriptor (MD) is called a Metric descriptor ID (MID). The WVID for a Watched Value is returned by the Harvester when the Watched Value (WV) is registered. Then, all subsequent references to the Watched Value (WV) are made using the WVID. The MIDs are assigned as the consumer builds up the Watched Values (WV). Each MID can be unique within its Watched Values. To maintain efficiency, MID should be kept as low as possible, since the Harvester may choose to use the MID as an index into an array structure. A straightforward way to accomplish this is to assign the MID values in increasing order as the metric descriptions are added. In one instance, once a Watched Value (WV) has been passed to a Harvester, the contained MIDs are fixed and cannot change.

In one embodiment, Harvesters support metrics with the following data types including: Base types (using Java parlance: int, float, double, String, etc), Wrapper types (Integer, Float, Double, etc) and Aggregate types (Collection, Array, Map). In one case, for interoperability, aggregate types are always converted to arrays when returned. In the case of maps, the set of map values is returned as an array, and the keys of the map are lost. In addition, a Harvester may support drilling down into complex types.

In one embodiment, resources are viewed as a collection of metrics. A consumer communicates to a Harvester by passing to the Harvester a WV, which contains a list of MDs. From a Harvester's point of view, each MD can be defined by the following three parts: Metric Object Type (type), Metric Instance Name (instance) and Metric Name (attribute). Attribute names can be specified hierarchically to allow a user to drill down into a complex object.

If a consumer of the data communicates with multiple Harvesters, the consumer can expand the syntax of the metric descriptor items to include a way to differentiate metrics which are serviced by multiple Harvesters. This is particularly important in an open environment where the consumer may need to support arbitrary third-party Harvesters, which are perhaps representing unknown resource types.

A consumer can tell if a particular Harvester serves a given a Metric descriptor (MD), and, if so, how to instruct the Harvester to collect it. A consumer first determines the set of metrics they are interested in observing. For example, the Controller can determine its MDs by parsing the provided rules. Once the list of metrics is determined, the consumer constructs a Watched Value (WV) describing the metrics of interest. The WV is the fundamental means of communication between a consumer and a Harvester. Once the WV is constructed it is passed to the Harvester for evaluation. The Harvester examines the WV and determines which, if any, of the contained MDs it is able to service. A list of items the Harvester can service is then returned to the consumer.

In one embodiment, reasons can be provided to the consumer for each Metric descriptor (MD) that cannot be serviced. The process of determining which MDs can be serviced by a Harvester is called validation. After validation, the consumer notifies the Harvester which of the set of serviceable items it wants it to monitor. This notification, called confirmation, starts the actual monitoring process.

The consumer can begin by directly passing a non-validated Watched Value (WV) to a Harvester for confirmation. But in so doing, the consumer forfeits the ability to detect early problems. Without validation, all problems with the WV are treated as runtime errors.

In one embodiment, all communication occurs using the Metric descriptor IDs (MIDs). In some cases, a single metric may be serviceable by multiple Harvesters. This may or may not be a problem depending on the circumstances. It is up to the consumer to handle this situation. The outcome can either be forcing the end user to disambiguate the metric or collecting data from each Harvester and combining the results.

A two-phase process can be used to cause a metric to be monitored. First, a validation phase is used to determine which metrics a Harvester can service. Then, a confirmation phase notifies the Harvester which metrics to collect. The confirmation phase also signals the Harvester to start the collection process. In one embodiment, validation and confirmation can occur more than once for a single Watched Value (WV). For example, one case is when an active WV is extended to include additional metric descriptors after the initial confirmation. In this case, the additional items are added using a similar 2-phase validation and confirmation process.

The validation phase includes a bidding step. During validation, the Harvester is passed in an instance of a Watched Value (WV). The Harvester then examines each Metric descriptor (MD) in the provided WV to determine if it can service that Metric descriptor. It returns a list indicating which items can be serviced. The returned items are in the form of bids, one for each MD.

In one example, each bid represents one of the following values: YES, NO and MAYBE. Here, YES indicates that the Harvester can definitely service the item; NO indicates that the Harvester definitely does not service the item; and MAYBE indicates that the Harvester does not know if it can service the item. The bids can be returned as a sparse list. The default for items not included in the returned list is NO. Therefore, any unserviceable metrics can simply be omitted from the returned list. In another example, the consumer does not instruct the Harvester to collect a metric, even though a Harvester bids YES (or MAYBE) for an MD. The consumer may then decide to use another Harvester which also bid YES. Or, the sequence of events may cause the consumer to reject the MD altogether.

If a Harvester bids YES for an MD, the Harvester is known as a declared Harvester for that metric descriptor. If it bids MAYBE, the Harvester is known as a potential for that metric descriptor. When a Harvester bids NO for a metric descriptor, it can include a list of reasons for rejecting it. The reasons can be in the form of Strings, which are internationalized with respect to the Harvester's locale. A default reason is that the metric is simply not supported by that Harvester. However, if the item is rejected for any other reason, the reason(s) can be provided.

Each Harvester attempts to identify all problems it can during the bidding process. In some cases, problems may not be known until much later. For example problems in the JMX may not be known until an instance is registered. When problems occur after bidding, the Harvester can log the issue(s) and remove the offending metric descriptor.

In one embodiment, the conformation process follows validation and starts the actual collection process. For example, after receiving the bids, the consumer examines the items that the Harvester bid either YES or MAYBE and selects those that it wishes the Harvester to collect. This list of such items is communicated to the Harvester and the observation process begins.

A bid, MAYBE, is included to support Harvesters that manage a dynamic, open set of metrics. An example of such a Harvester, builds on top of a JMX MBeanServer. In JMX, a new instance can be introduced at any point in time. It is impossible to know in advance the complete set of instances that the Harvester can support. Another aspect of JMX is that there is no intrinsic notion of MBean type. To support types in an MBean server, the type is derived from the set of instances. Because of this, it is also not possible to know in advance what types may exist.

Open Harvesters do not know the complete set of items that they can manage. Open Harvesters can bid MAYBE for metric descriptors that appear legal, but are not known at the time of the bidding. Open Harvester can bid NO only if the metric descriptor is known to be illegal. If the metric descriptor represents items that exist at the time of the bidding, an open Harvester can bid YES. In one embodiment, an open Harvester can treat only some metrics descriptors as open.

A bid of MAYBE is useful to a consumer even though it is not definitive. For example, when one Harvester bids YES and one Harvester bids MAYBE, the consumer may choose to remove the metric from the Harvester that bid MAYBE and use the Harvester that bid YES. Another example is when no Harvesters bid either YES or MAYBE, the consumer can notify the end user that resolution is not possible given the current set of Harvesters. If a Harvester bids MAYBE, the consumer is free to confirm the bid. Once confirmed, the Harvester can put into place mechanisms to identify when the metric appears. And the Harvester can automatically start observing it, if the metric appears later.

In another embodiment, a Harvester can support multiple Watched Values (WVs). WVs can be added and removed at any point in time while the Harvester is active. Also, at any time, active WVs can be expanded by adding Metric descriptors (MDs), or contracted by removing Metric descriptors (MDs). In one case, even though WVs cannot be disabled, individual MDs within the WV can be disabled and re-enabled at any time. In addition, a WV can be effectively disabled by disabling all its MDs.

Observer

Observer provides information about managed resources to a Controller. The Controller can communicate with a number of different Observers to manage diverse types of resources. Each of the different Observers provides information about the resources of different types based on a Generic Observer Contract (GOC). GOC standardizes the interface to the potentially diverse resources. Specific differences among resource types can be handled by the individual Observers and surfaced using the standard API, thus hiding those differences from the Controller.

While one type of consumer for an Observer is a Controller, there can be other types of clients as well. For example, a Controller can interoperate with other management systems. Thus, a third party management platform can choose to monitor resources. In such a situation, the third party product interfaces directly with an Observer.

In one embodiment, in addition to monitoring raw resources, consumers sometimes can aggregate or transform the information provided by Observers. For example, a consumer can monitor the average of a resource metric, but the available Observer provides only the individual values. One way to handle this is to write a more complex consumer. However, this approach is undesirable because it causes resource-specific intelligence to be embedded in the consumer. On the other hand, Observers can be defined hierarchically. So, one Observer can access another Observer to obtain raw values, and can, in turn, provide transformed values to their consumer(s).

Figure 10:
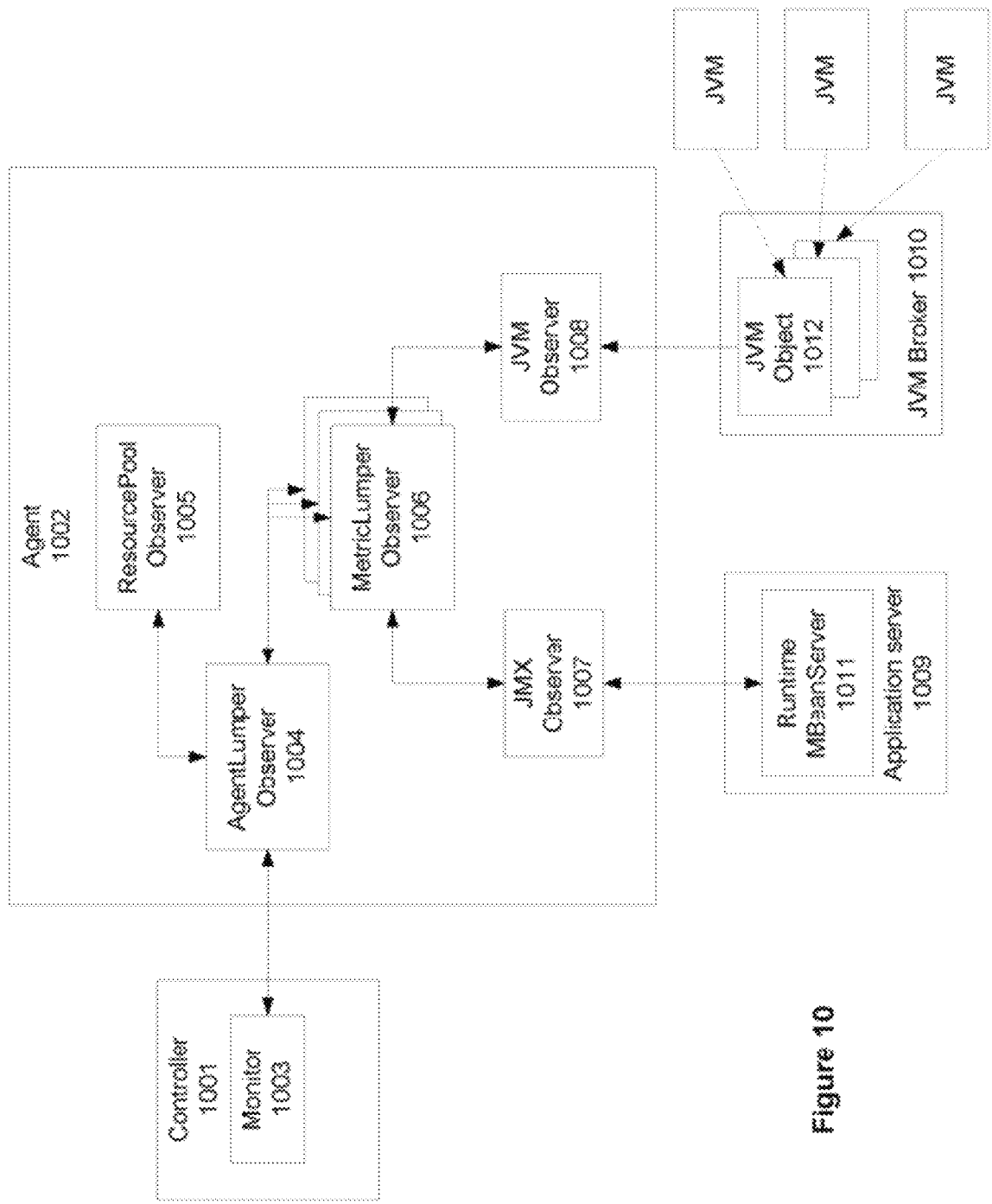
FIG. 10 is an illustration of the Observer model that allows Observers to be nested into Observer hierarchies in accordance with one embodiment.

FIG. 10 is an illustration of the Observer model that allows Observers to be nested into Observer hierarchies. A Collector is a non-leaf Observer in the hierarchy which provides a single point to access multiple, otherwise disparate, entities.

In one embodiment, the Collector can transparently merge values from multiple sources. For example, as shown in FIG. 10, a MetricLumperObserver (MLO) 1006 can combine metric values from the underlying JVMObservers (JVMO) 1008 and JMXObservers (JMXO) 1007 for the monitored process. The AgentLumperObserver (ALO) 1004 can combine values from the ResourcePoolObserver 1005 and the appropriate MetricLumperObservers 1006. In this example, the AgentLumperObserver 1004 provides access to all the processes running in the Agent 1002. The JVMObserver 1008 collects and distributes different sorts of information, such as information about a JVM started by a Resource Broker and metrics from a running JVM. Metric Values are obtained from a JVM object 1012 provided by the JVM Broker 1010. In this example, the JVMObserver 1008 sits between the MetricLumperObserver 1006 and the JVM object 1012. In addition, the JMXObserver 1007 collects and distributes information about a RuntimeMBeanServer 1011 in an Application Server 1009 or from an arbitrary MBeanServer in any process. A JMXObserver 1007 can also be parameterized to collect metric data from arbitrary MBeanServers. The JMXObserver 1007 can also collect metrics from a remote MBeanServer. Metric Values are obtained using the standard JMX API and distributed to consumers using the standard Observer API. In this case, the JMXObserver 1007 sits between the MetricLumperObserver 1006 and the MBeanServer 1011.

In one embodiment, the Observer Adaptor Framework (OAF) employs a collection of interfaces and classes to implement Observers and ObserverManagers.

In one embodiment, if the Observer is configured to expose a web-service, the service is automatically exported by the Observer Adaptor Framework. The Observer Adaptor Framework allows remote Observers to also be accessed locally. The Observer Adaptor Framework also handles any inbound and outbound remote data conversion.

The Observer Adaptor Framework (OAF) also supports Value Encoding (VEN). In one OAF implementation, Value Encoding (VEN) is the default when the Observer is accessed remotely. In another example, the consumer can specify this behavior on a WatchList-by-WatchList basis. In addition, OAF handles all aspects of a filtering model (FIM), including the caching of and comparison with previous values. FIM can be the default when the Observer is accessed remotely. In one example, the consumer can specify this behavior on a WatchList-by-WatchList basis. OAF can also handle all aspects of push model support using a Push Manager. This can be done either by allowing a Push Manager reference to be passed in the constructor for an Observer or using an Observer Manager that is infused with a Push Manager which will, in turn, be provided to its spawned instances.

Figure 11:
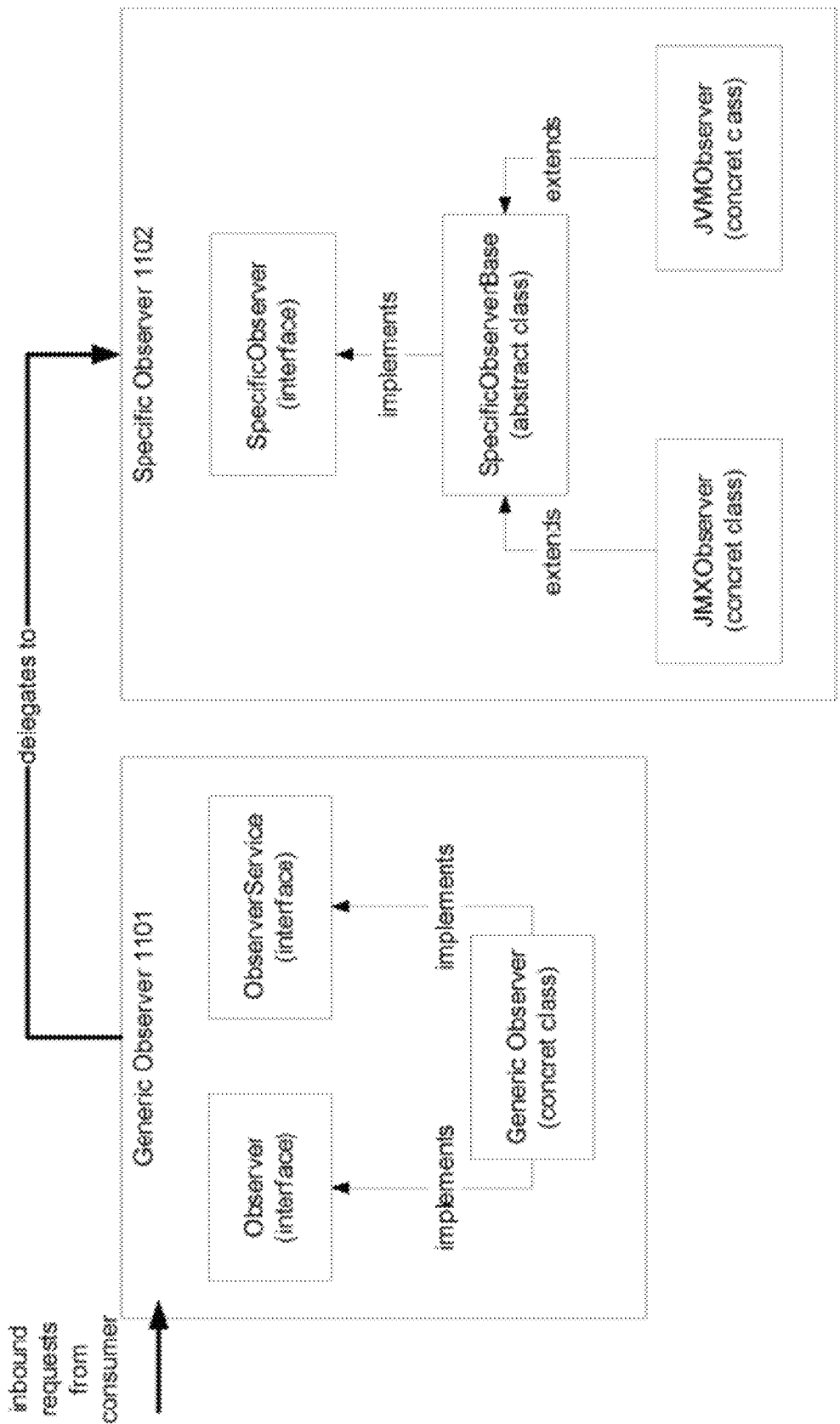
FIG. 11 is an illustration of the portion of the Observer Adaptor Framework (OAF) that pertains to the Observer in accordance with one embodiment.

FIG. 11 is an illustration of the portion of the Observer Adaptor Framework (OAF) that pertains to Observer. As shown in FIG. 11, a single generic object, called the Generic Observer 1101, represents all Observers. The specific behaviors that make a particular Observer unique are provided by a delegate class, the Specific Observer 1102. The Generic Observer 1101 fields all requests from the consumer and delegates to the Specific Observers on an as-needed basis.

In one embodiment, the Generic Observer is the root of the Observer that is provided by the Adaptor framework, instantiated either directly by the consumer, or automatically by the Observer Manager. On the other hand, the Specific Observer conforms to the Adaptor contract and is instantiated by either the consumer or (as in WLOC) automatically by the Observer Manager. SpecificObserverBase is an abstract super-class which Specific Observers extend. The SpecificObserverBase class makes it easier to write a Specific Observer by handling the binding with the Generic Observer and providing default implementations for portions of the SpecificObserver interface.

Figure 12:
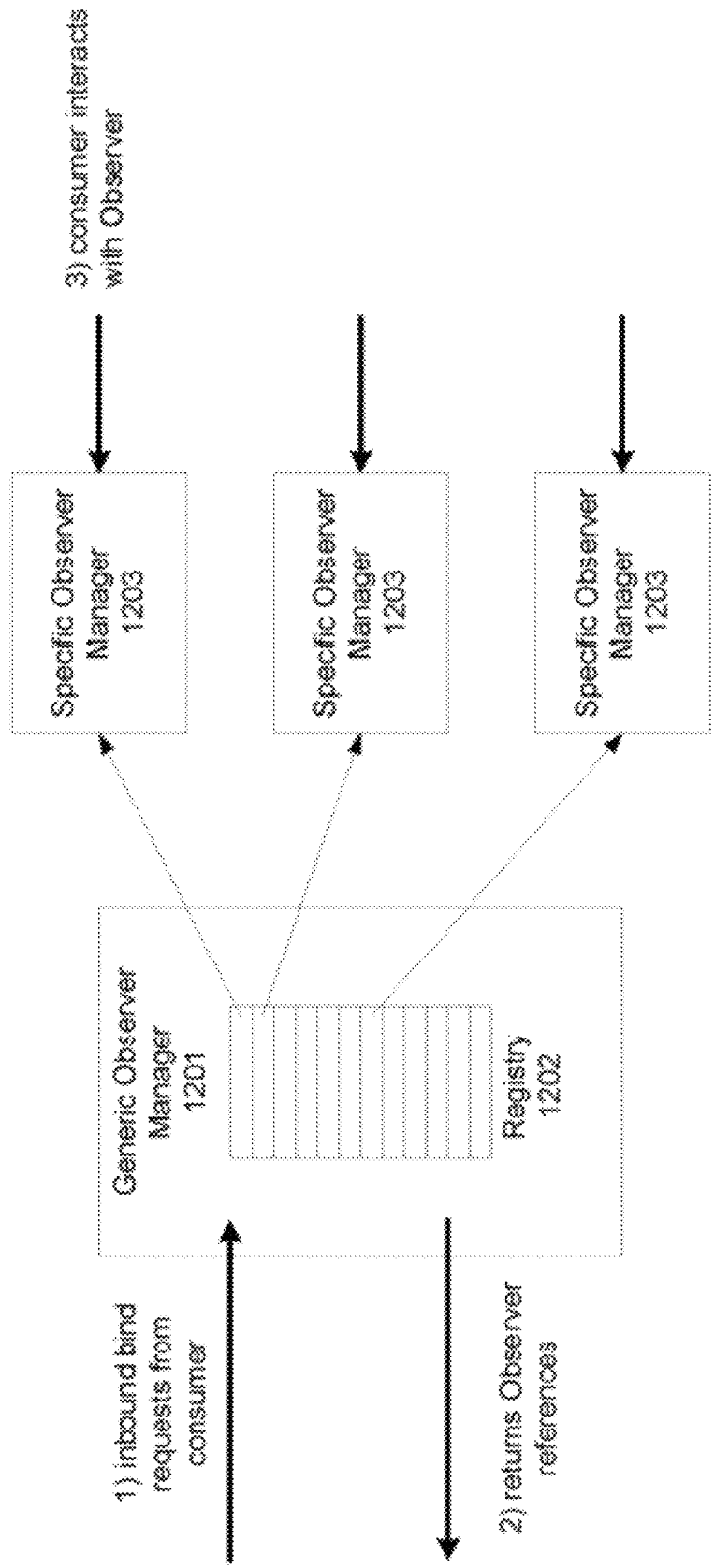
FIG. 12 is an illustration that shows the relationship between an ObserverManager and the Observers it manages, in accordance with one embodiment.

FIG. 12 illustrates the relationship between an ObserverManager and the Observers it manages. As shown in FIG. 12, an inbound bind request from a consumer is first received by the Generic Observer Manager 1201, which manages the individual Specific Observer Managers 1203 using a registry 1202. Then, the Generic Observer Manager 1201 returns Observer references to the consumer, which, in turn, interacts with each individual Specific Observer (not shown).

ObserverManagers act as factories and registries for the Observers that they manage. The Observer Adaptor Framework (OAF) provides for both the creation of new Observers and/or access to existing Observers. In addition, the Adaptor provides a pub-sub mechanism whereby clients can be notified when its Observers come and go. OAF also provides the capability for ObserverManagers to be accessed both locally and remotely. Remote access allows an Observer to be created from another process. To configure an ObserverManager to be remotely accessible, it is provided with a CommunicationService instance and a base URL. Both can either be passed in during construction, or set using bean setters. The setters can also be infused through OSGi. If the managed Observers are configured for remote access, the OAF handles exporting the remote interface to the Observers it creates. In addition, the OAF handles the creation and removal of Observers.

Figure 13:
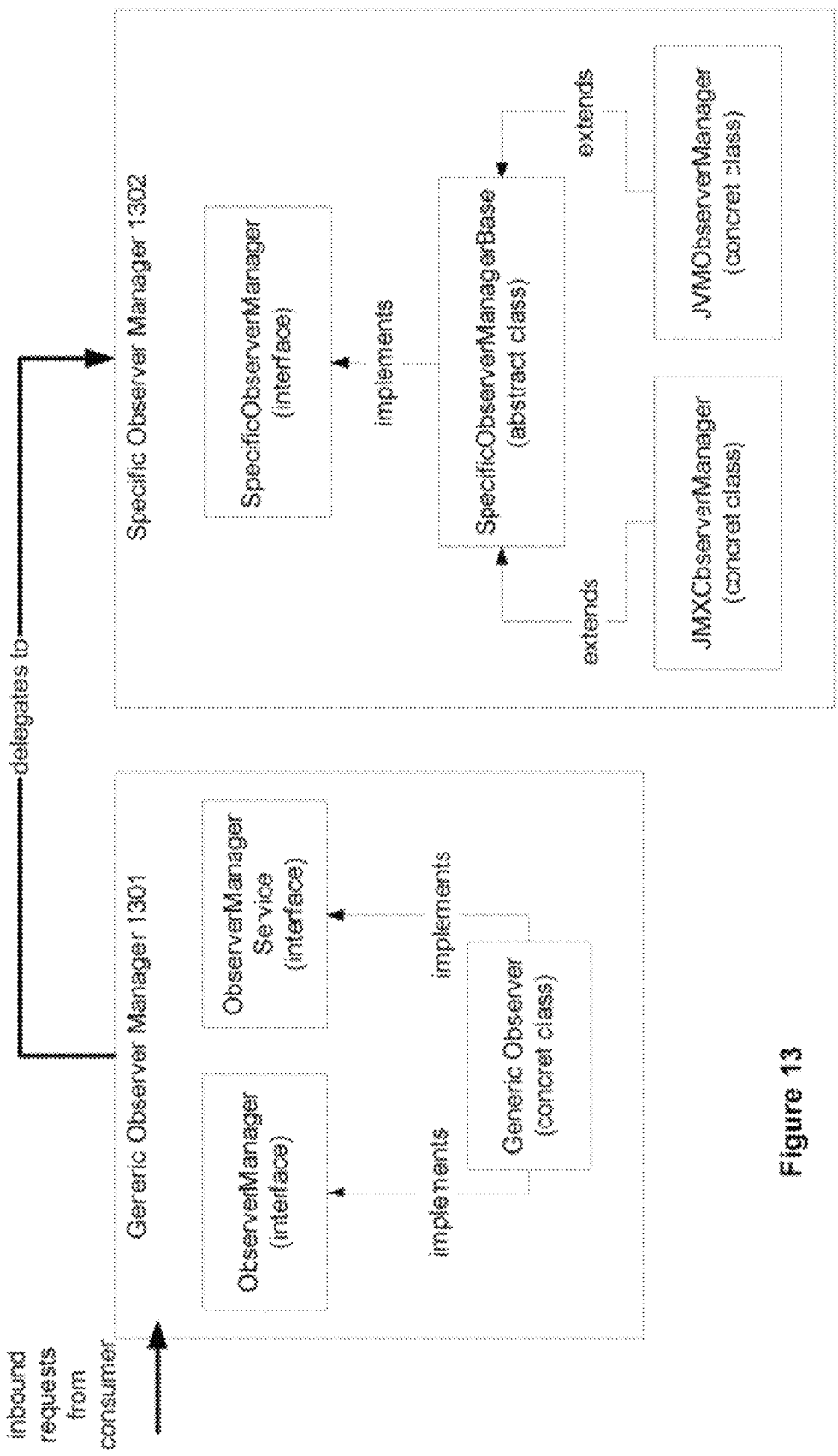
FIG. 13 is an illustration of the portion of the Observer Adaptor Framework (OAF) that pertains to the Observer Manager in accordance with one embodiment.

FIG. 13 is an illustration of the portion of the Observer Adaptor Framework (OAF) that pertains to the Observer Manager. As shown in FIG. 13, a single generic object, called the Generic Observer Manager 1301 represents all ObserversManagers. The specific behaviors that make a particular ObserverManager unique are provided by a delegate class, the Specific Observer Manager 1302. The Generic Observer Manager 1301 fields all requests from the consumer and delegates to the Specific Observer Manager on an as-needed basis. Here, Generic Observer Manager 1301 is the root of the ObserverManager.

Metrics can be collected in either a One-Shot observation pattern (OSOP) or a Repeat observation pattern (ROP). The assumption for OSOP is that the metric is collected only once. The consumer specifies the values they want to collect and the Observer provides the values at a single point in time. On the other hand, the assumption for ROP is that the metrics are collected multiple times. The consumer specifies the values they want to collect and the Observer then optimizes so as to efficiently collect the values over and over. This model is useful for graphing and for driving ongoing rule evaluations. In one embodiment, the ROP has a two-phase registration process that allows the consumer to validate the Metric descriptors (MDs) in a separate call. The OSOP combines validation and data collection into a single operation.

In One-Shot observation pattern (OSOP), the user passes in a list of metrics and the resulting values are immediately returned. On the other hand, the Repeat observation pattern (ROP) requires the consumer to pre-register the list of metrics with the Observer. The One-Shot observation pattern (OSOP) is straight forward, since the user does not need to access the values more than once. Alternatively, the Repeat observation pattern (ROP) is more efficient if the user does need to access the values more than once. ROP can also be used if the consumer has need of a comprehensive validation process.

The One-Shot observation pattern (OSOP) model returns
  The index into the original list allowing the returned value to be associated with the provided Metric descriptor (MD).
  A list of RawValue Objects, one for each instance collected from. Each RawValue contains the instance data (type name and instance name) and the ObserverContext associated with the collected value. Of course, it also contains the collected value(s)—as an array. If the MD contains no regular expressions, then this array will contain a single element.
  A list of issues that occurred during harvesting. Each issue includes the instance data and a localized string (localized with respect to the ObserverContext) describing the issue. Issues are related to either validation or resolution.
  A list of errors that occurred during data collection. Each error includes the instance data and a localized string (localized with respect to the ObserverContext) describing the error. Errors reflect problems that occurred during data collection.

The Repeat observation pattern (ROP) is designed to handle dynamically changing domains, because the ROP typically operates over an extended period. One such feature provides support for allowing the consumer to register interest in them before they exist. Values can then be collected when/if the instances become available. In contrast, the One-Shot observation pattern (OSOP) only returns values for currently resolvable metrics.

The Repeat observation pattern (ROP) returns the following formation for each collected MD.
  Indexes associated with the value.
  A list of RawValue Objects, one for each instance collected from. Each RawValue contains the instance data (type name and instance name) and the ObserverContext associated with the collected value. Of course, it also contains the collected value(s)—as an array. If the MD contains no regular expressions, then this array will contain a single element.
  A list of deleted instances that previously provided values for the MD. This is non-null only when using the filtering model.
  A list of errors that occurred during data collection. Each error includes the instance data and a localized string (localized with respect to the ObserverContext) describing the error. Errors reflect issues with validation and resolution, as well as problems that occurred during data collection.

In one embodiment, consumers can access the Observer using either a Pull model or a Push model. In a pull model, the consumer calls the Observer whenever they want data to be collected and provide the metrics of interest. In a Push model, the consumer designates how often each value is desired and then the Observer calls the consumer whenever new values are collected.

The pull model can be used with both the repeat and one-shot observation patterns. When using the pull model the consumer asks for the values by providing a list of metrics to be collected. If the Repeat observation pattern (ROP) is used, the values are specified by providing a list of Watched Lists (WLs) and providing a list of MIDs to be collected for each Watched List. If the one-shot pattern is used, the consumer passes a simple list of metric descriptors. All available values that appear on the provided list are collected.

The push model is valid only for the repeat observation pattern. In the push model the consumer provides a callback when they register a Watched List (WL). That callback gets invoked whenever values are collected which correspond to metrics in that WL. Because the callback is only used with the push model, the provision of a callback can be used as a flag indicating that the push model is desired.

When using the push model, values are returned based on the sample period specified in the Watched List (WL). Therefore, on any given invocation of the callback, only a subset of the active values may be collected. If no values are collected for a specific Watched List (WL), the callback is not invoked at all. For example, two metrics, A and B, have a sample period of 2 and 4 seconds, respectively. Values for both A and B are collected every 4 seconds, while in between each of these calls a value of A alone is collected.

In one embodiment, the Generic Observer Contract (GOC) includes several primary entity types. Among them, the Repeat observation pattern (ROP) uses the Repeat Pattern Entities that includes a Metric descriptor (MD), Watch List (WL), and an Observed Value (OV). The Metric descriptor (MD) is a description for a metric; or if wildcards are used, for a set of metrics. Each MD specifies an instance (or instances) and an attribute on those resources. The MDs are provided to the Observer by the consumer to designate what to collect. The Watch List (WL) is a collection of metric identifiers provided by the consumer to specify the metrics to be collected in the repeat collection pattern. The Consumers provide a WL to an Observer in order to specify what metrics are to be monitored by the Observer. The Observed Value (OV) is the value object that an Observer provides to the consumer on each observation cycle. One OV is provided for each observed MD.

On the other hand, the One-Shot observation pattern (OSOP) uses One-Shot Pattern Entities that include a SimpleMetricDescriptor (SMD), and SimpleObservedValue (SOV). The SimpleMetricDescriptor (SMD) is a description for a metric; or if wildcards are used, for a set of metrics. Each SMD specifies an instance (or instances) and an attribute on those resources. The MDs are provided to the Observer by the consumer to designate what to collect. The SimpleObservedValue (SOV) is the value object that an Observer provides to the consumer during a one-shot observation cycle. One SOV is provided for each observed MD.

In addition, both collection models share ObserverContext (OC), which is an object that can identify an Observer and can be used by a consumer to select which values are of interest.

In the case of Repeat observation pattern (ROP), Watch Lists are registered using a two phase process. When this process completes, MDs and WLs are each assigned unique identifiers. Subsequent calls and returned values use these identifiers. This approach increases performance by avoiding sending Strings repeatedly over a remote connection, and by avoiding String comparisons. Also, an Observer or consumer implementation can use these IDs as indices into an ordered list structure, thereby improving lookup times.

The returned values include the instance and context information. This information is often in the form of long strings which are relatively expensive to transmit remotely. Because of this, an Observer may optionally provide for a type of compression of this information, or value encoding (VEN), or simply encoding. Any consumer that is written to access arbitrary Observers is prepared to access value encoded values.

For example, the following values are returned in three subsequent observation cycles:

Cycle 1—T1/I1/C1, v1) (T2/I2/C2-1, v2) (T2/I2/C2-2,v3)

Cycle 2—(T1/I1/C1, v4) (T2/I2/C2-2, v5) (T3/I2/C2-3, v6)

Cycle 3—(T1/I1/C1, v4) (T2/I2/C2-1, v2) (T3/I2/C2-3, v6)

The following is how the above values are returned with value encoding in place:

Cycle 1—(T1/I1, v1) (T2/I2-1, v2) (T2/I2-2, v3)

Cycle 2—(0, v4) (2, v5) (T3/I2-3, v6)

Cycle 3—(0, v4) (1, v2) (3, v6)

In one embodiment, the values of many metrics do not change frequently. In this case the consumer might not want to receive the value each time, for example, when the consumer is using the push model and is accessing the Observer remotely. They want to forgo any remote calls that provide no new data. And when calls are made they do not want to transfer any more data than is needed. Another example is when the consumer is using the pull model and accessing the Observer remotely and does not want to transfer any more data over the wire than is needed. Or, when the consumer is executing rules against the values. If a value is unchanged the consumer may not need (nor want) to incur the overhead of re-evaluating the rule constraints.

In another embodiment, Observers can optionally provide a means whereby the consumer can request that values are only returned when they have changed. When this mode is active, a value is returned once, and not returned again until the value changes. This feature is called the filtering model (FIM) or simply filtering.

The AgentLumperObserver (ALO) manages the Observers for all the running processes. For any given cycle, the Monitor may be interested in only a subset of those processes. The ObserverContext (OC) provides a means whereby an Observer namespace can be extended to account for nested Observer data. When Observers are created, they can be optionally tagged with an OC. In one case, when a call is made to an Observer with an OC provided, the Observer returns only those values that come from Observers that match the provided context.

An ObserverContext (OC) is a collection of key/value pairs in two forms: a static form where the key values are constants, known as an ObserverContextSpecific (OCS), or, a variable form where the key values are regular expressions, known as a ObserverContextPattern (OCP). In one embodiment, Observers can only be tagged with an ObserverContextSpecific (OCS). The methods in the Observer API all take ObserverContextPatterns (OCPs). When a call is made to an Observer, the Observer and all its nested Observers match the provided OCP against the Observer's OCS. If the OCP does not match, the Observer does not return any values.

For example, the following rules apply for matching purpose:
  If either the OCP or the OCS is null, the match succeeds.
  Otherwise, the OCP and OCS must contain exactly the same keys.
  And the values associated with each key in the OCS must match the corresponding regular expression value in the OCP.

The Controller selects data associated with specific managed processes. Each managed process is represented by a MetricLumperObserver (MLO). Therefore, the only Observer type which is tagged with an OC is the MLO. When requests are made by the Controller, the AgentLumperObserver (ALO) ignores the OC (since it has no OCS itself), but passes it to the ResourcePoolObserver (RPO) and to each MLO. The RPO, which also has no OCS, processes the request. But the MLO only processes the request if the provided OCP matches its OCS. If it matches, calls are made to the JMX and JVMObservers for that process (since neither is tagged with an OCS). If an MLO's OCS does not match, the collection process is short-circuited, and the JXM and JVMObservers for that process are not called.

In one embodiment, when using the repeat collection pattern sometimes more than one Observer may bid YES (or MAYBE) for the same metric. For example, if a consumer specifies a type name and an attribute name, but wildcards the instance name, a metric may be serviced by multiple Observers. Therefore, if a consumer communicates with multiple Observers, it is recommended that the consumer expand the syntax of the metric descriptor to include a way to differentiate those metrics which are potentially serviced by multiple Observers.

In one embodiment, when using the Repeat collection pattern (ROP), a consumer identifies which, if any, of a set of potential Observers handles a particular metric, and, once determined, how the Observer is directed to start the collection process.

The consumer first determines what metrics they are interested in observing. Often the consumer does not have specific metrics, but rather Metric Descriptors (MDs), which map to multiple metrics. The Controller, for example, determines the list of metrics by parsing the provided constraints. Once the list of MDs is determined, the consumer constructs a Watch List (WL) describing those MDs. The Watch List (WL) is the fundamental means of communication between a consumer and an Observer.

Once the Watch List (WL) is constructed, it is passed to each Observer in turn. The Observer then examines the WL and determines which, if any, of the provided MDs it is able to service. A list of items that the Observer can service is then returned to the consumer. This process is called bidding. Later the consumer can notify each Observer as to which of the set of serviceable items it wants it to monitor. This notification, called confirmation, starts the actual monitoring process.

In one embodiment, the watch list information is distributed only once for efficiency. After the initial transfer of the WL all communication occurs using the identifier for the Watch List (WL) and the identifiers for the contained MDs. To make this work both the consumer and Observers must maintain a virtual copy of the active WL, indexed by the MIDs. This copy is called the Master Watch List (or MWL).

In some embodiments, a single metric may be serviceable by multiple observers. It is up to the consumer to handle this situation either by forcing the end user to disambiguate the metric or to collect data from each Observer and combine the results.

In one embodiment, registering a metric to be monitored is a two-phase process: a bidding phase and a confirmation phase. The bidding phase is used to determine which metrics an Observer can service. The confirmation phase notifies the Observer which of the serviceable metrics to collect. The confirmation phase also signals the Observer to start the collection process. Note that some of the metrics that were identified as observable in the bidding phase may be omitted by the consumer in the confirmation.

Bidding and confirmation may occur more than once for a single Watch List. This occurs when an active Watch List is extended to include additional metric descriptors at some point after the initial confirmation. In this case, the additional items are added using a similar 2-phase bidding and confirmation process.

Bidding involves the use of a Master Watch List (MWL). The MWL is the active version of a Watch List, reflecting any items that were added or deleted over time. To stay in sync, both the consumer and Observer must maintain consistent versions of the MWL. The Master Watch List can only be created or modified through the bidding process.

During the initial bidding, the Observer accepts an initial WL from the consumer. This list becomes the MWL. The Observer then examines each MD in the provided WL to determine if it can service it. It returns a list indicating which items can be serviced. The returned items are in the form of bids, one for each MD in the watch list.

In one embodiment, each bid is one of the following values:
  YES—Indicates that the Observer can definitely service the item.
  NO—Indicates that the Observer definitely does not service the item.
  MAYBE—Indicates that the Observer does not know if it can service the item.

The resulting bids are returned as a sparse list. Each element includes its MID. The default for items not included is NO. Note that this implies that any unserviceable metrics can simply be omitted from the returned list. In the case of a naming conflict with another Observer, an affirmative bid might be rejected by the consumer. In this case the consumer simply does not include that item in the confirmation list.

If an Observer bids YES for a metric descriptor, the Observer is known as a declared Observer for that metric descriptor. If an Observer bids MAYBE, the Observer is known as a potential for that metric descriptor. Note that it may be possible to have more than one Observer service a single metric descriptor.

When an Observer bids NO for a metric descriptor, it may include a list of reasons for rejecting the item. The default reason is that the metric is simply not supported by that Observer. In this case the Observer will not include a reason. A simple NO bid is sufficient. However, if the item is rejected for any other reason, that reason(s) must be provided.

Each Observer must attempt to identify all problems it can during the bidding process. Unfortunately, some problems may not be known until much later. For example, problems in JMX may not be known until an instance is registered. When problems occur after bidding they are returned as part of the value payload for the MD.

The confirmation process follows the bidding and starts the actual collection process. After receiving the bids, the consumer examines the items that the Observer bid either YES or MAYBE for and selects those that it wishes the Observer to collect. This list is communicated to the Observer and the observation process begins.

In one embodiment, MAYBE is included to support Observers that manage a dynamic, open set of metrics. An example is an Observer built on top of a JMX MBeanServer. In JMX, a new instance can be introduced at any point in time. It is impossible to know in advance the complete set of instances that the Observer will support. Another aspect of JMX is that there is no intrinsic notion of MBean type. To support types in an MBean server, the type is derived from the set of instances. Because of this, it is also not possible to know in advance what types may exist.

Observers that do not know the complete set of items that they can manage are Open Observers. Open Observers bid MAYBE for metric descriptors that appear legal, but for which instances are not known at the time of the bidding. An Open Observer bids NO only if the metric descriptor is known to be illegal. If the metric descriptor represents items which exist at the time of the bidding, an Open Observer bids YES.

It is possible for an Open Observer to treat some metrics descriptors as open and others not. In this case, the ones that are treated as open are known as open metric descriptors. While not definitive, a bid of MAYBE can still provide useful information to a consumer. In one example, one Observer bids YES and one Observer bids MAYBE. Hence, the consumer may choose to remove the metric from the Observer that bid MAYBE and collect only from the Observer that bid YES. In another case, if no Observers bid either YES or MAYBE, the consumer can reliably notify the end user that resolution is not possible given the current set of Observers.

When an Observer bids MAYBE the consumer is free to confirm the bid. If confirmed, the Observer can then put into place whatever mechanisms it needs to identify when/if the metric appears. And should the metric appear, the Observer automatically starts returning values for it.

In one embodiment, the Observer allows the caller to forgo the two-step process by combining the two steps into a single step, or a declare-and-confirm step. This is useful for consumers that do not need to validate metrics. And it can be used for remote consumers that do not want to incur the overhead of making two remote calls to register a Watch List. When using declare-and-confirm, the consumer forgoes the up-front validation of the Watch List. Instead, any validation issues result in errors returned in the value payload at collection time. As such, validation errors are syntactically indistinguishable from runtime errors. On the other hand, for the One-Shot observation pattern (OSOP), the consumer simply provides the list of desired metrics and the Observer returns what values it can.

In one embodiment, the two-phase process in the Repeat collection pattern (ROP) provides an inherent method to validate the metrics. Validation occurs during the collection process for the One-Shot observation pattern (OSOP). In OSOP, each returned Simple Observed Value (SOV) contains a list of issues as well as a list of errors. The issues list communicates validation and resolution problems and the errors list communicates problems that occurred during the collection of a resolved metric. In the case of an open Observer, if an MD fails to resolve to a current instance, then an issue is returned. This is in contrast to the two-phase repeat model where failure to resolve results in a MAYBE bid.

In one embodiment, when using the ROP, an Observer is prepared to support multiple Watch Lists (WLs). WLs can be added and removed at any time while the Observer is active. Also, at any time active WLs can be expanded (MDs added) and contracted (MDs removed). WLs cannot be disabled, but individual MDs can be disabled and re-enabled at any time. Disabling all the MDs in a WL effectively disables the WL.

Communication of Monitoring Data from the Agent to the Controller

Figure 14A:
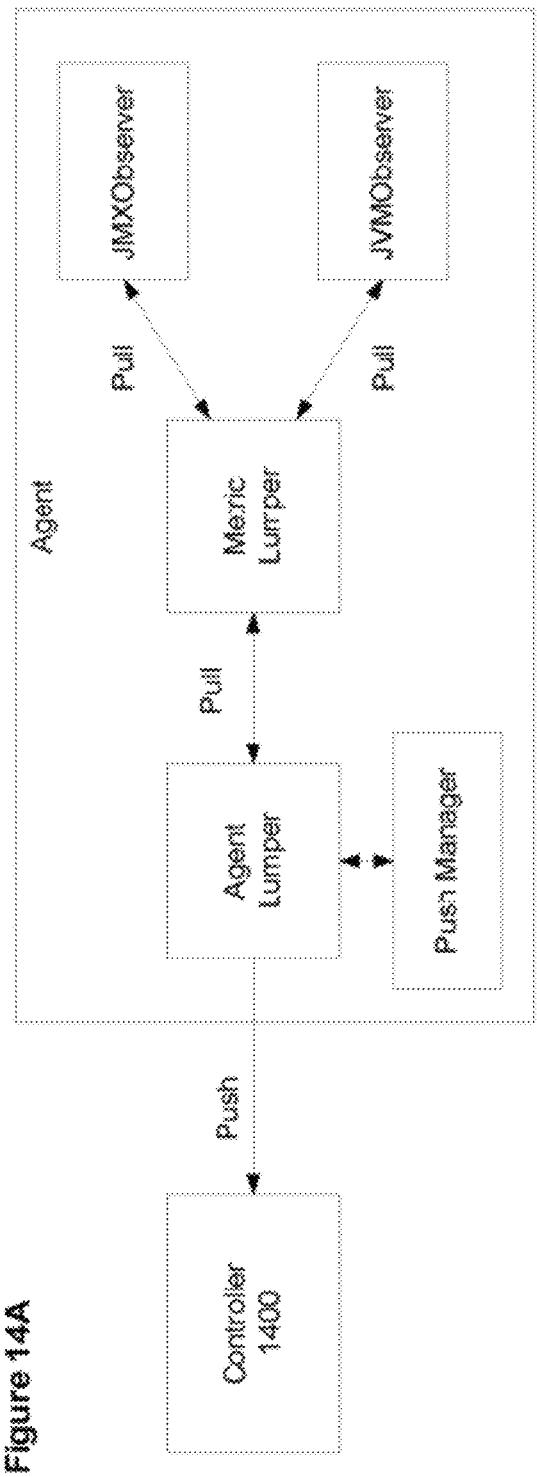
FIG. 14A is one example of the communication of monitoring data from the Agent to the controller using the push model in accordance with one embodiment.

There can be at least two possible models to handle the Communication of Monitoring Data from the Agent to the Controller. One choice is to use the push model for communication of monitoring data from the Agent to the controller as shown in FIG. 14A. In one case, the controller 1400 interfaces with multiple Agents. The data from these Agents needs to be correlated by the controllers for various reasons. For example, the Controller needs to create composite metrics, which represent the average value of a metric across the Agents. But, since each Agent operates using its own clock, one needs to correlate the values in a consistent manner when using the push model.

Figure 14B:
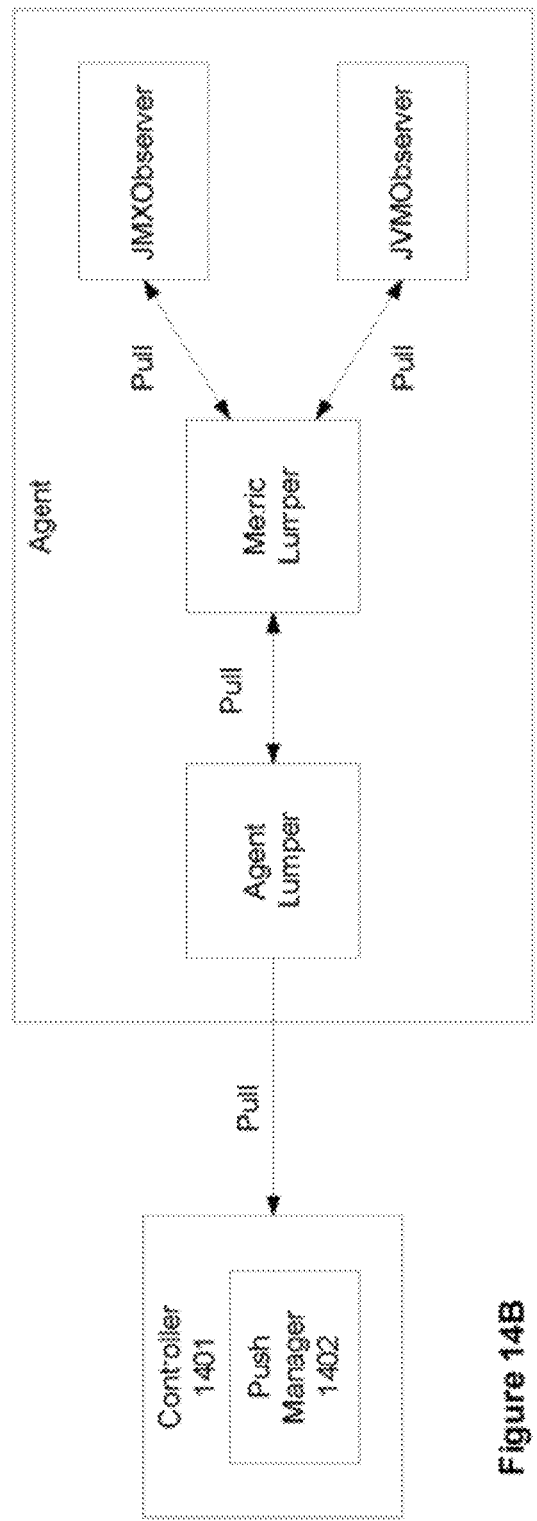
FIG. 14B is another example of the communication of monitoring data from the Agent to the controller using the push model in accordance with one embodiment.

Another choice is to use the pull model throughout as shown in FIG. 14B. The controller 1401 uses the modular Push Manager 1402 to notify it when to collect values, and what values are to be collected at what point in time. When a Push Manager callback occurs, the controller simply collects the specified metrics from each Agent. When all values are retrieved, the results are processed as a single time slot. This is a better choice, however, when multiple Agents are difficult to correlate, fractional additional operation costs are incurred due to overhead.

In one embodiment, a Push Manager allows a consumer to register items that need to be handled in some way at periodic intervals. When an appropriate processing interval is provided for an item, the Push Manager calls the consumer to process the item at each time the interval elapses. The Push Manager refers to these items as Monitorables (MONs). Consumers can register any number of items to the Push Manager, each having distinct intervals. When multiple items are registered, the Push Manager notifies the consumers (using a single call) of all items that are ready for processing at any given time. The points in time when notification occurs, are called milestones of the associated Monitorables.

In one embodiment, the Push Manager uses a callback model. When a consumer registers with the Push Manager the consumer provides a callback, which is an instance of interface PushManagerCallback, which is invoked when a registered item is to be processed. In one embodiment, a consumer can register more than once with the Push Manager, if the consumer wishes to have different callbacks for different types of items. In one example, the Push Manager has no way of telling when two registrations come from a single consumer, so each are treated as completely separate. However, the Push Manager has the notion of clients. Each registration results in a new client, though two clients may represent the same consumer.

Figure 15:
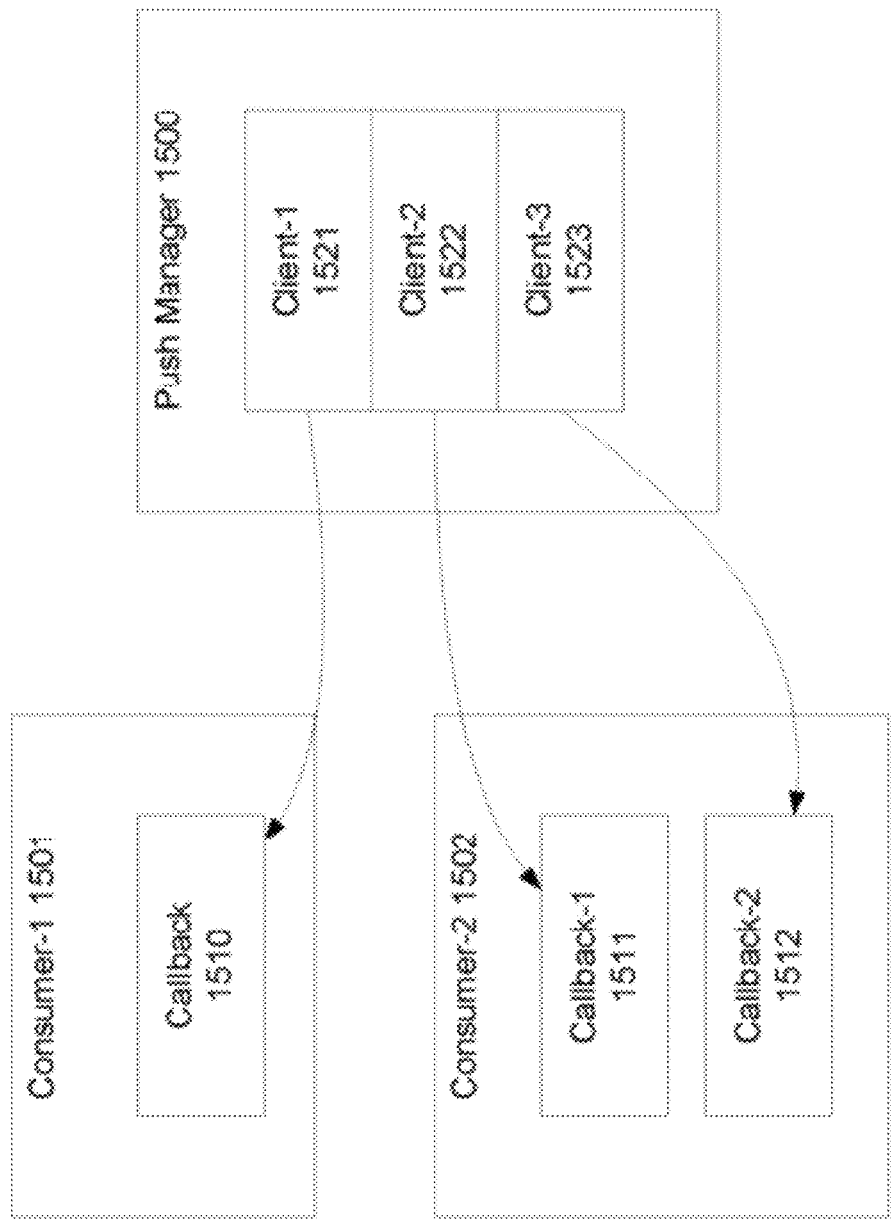
FIG. 15 is an illustration of the portion of the Observer Adaptor Framework (OAF) that pertains to the Observer Manager in accordance with one embodiment.

As shown in FIG. 15, Consumer-1 1501 and Consumer-2 1502 are two consumers of a Push Manager 1500. Consumer-1 1501 registers only once 1510 with the Push Manager 1500 while Consumer-2 1502 registers twice 1511 and 1512. As a result, three clients 1521, 1522 and 1523 are defined in the Push Manager.

In one embodiment, once a client has been registered, the Push Manager needs to be populated with the items the consumer wants to periodically handle. Consumers add Monitorables by calling method addValue, passing in the following information: CLID which identifies the client for which the Monitorable is being added and allows the Push Manager to identify which callback to invoke when the Monitorable's milestones occur; Interval, in seconds, at which the Monitorable's milestones occur; an user-provided key for the MON; and, an user-provided value for the MON. In one example, the value and key are returned to the consumer when the callback occurs and can be used to identify what item requires processing at that time. On the other hand, Monitorables that have been added can also be removed.

In one embodiment, until the Push Manager is started, no data associated with a client is monitored and no callbacks are made. Before the Push Manager is started, the state is stopped. After the Push Manager is started, the state is running. In one example, to start the Push Manager a consumer calls the method start, passing only the CLID for the appropriate client. Clients can be started and stopped at will. When a client is stopped all registered Monitorables are preserved, and the client can be restarted at a later time, picking up where it left off. To stop a running client a consumer calls method stop, passing in only the CLID of the client to be stopped.

In one embodiment, relevant client callbacks are invoked whenever milestones are reached. All Monitorables that apply for that client at that time are handled in a single call. The data passed to the callback method allows the consumer to triage the various milestones that are being processed. The following describes the format of the provided information.

In one example, two pieces of information are provided to the callback: a Map containing all the Monitorables for which a milestone is reached and a list of intervals represented by the provided Monitorables. The Map, valuesByKey, provides the relevant MONs categorized by their provided key. If it is useful, the client is free to manipulate the returned Map and/or its contained Sets. The second item, intervals simply provides the intervals that are represented in this batch of Monitorables.

In one embodiment, when a consumer is permanently done with a client, they call method deregister, passing in the CLID of that client. Unlike stopping the client, deregistration releases all registered Monitorables.

In another embodiment, The PushManager can be removed and all resources freed by calling the method shutdown. When shutdown is called the internal timer is stopped and all registered clients are deregistered. Further calls to this PushManager result in errors.

In another embodiment, all callbacks are made through individual threads. If a callback execution is time-consuming (i.e. on the order of seconds), this might cause a lot of threads to be active. If this happens it may cause compromises in the milestone contracts for the Monitorables. And if it is severe, it might even impact other aspects of the system through general thread starvation.

In still another embodiment, if it is expected that milestones may not be processed efficiently, then the consumer can consider using a FunnelingCallback. A FunnelingCallback is a special class which implements the PushManagerCallback interface, but has a different threading behavior. A FunnelingCallback uses a single thread to process all the milestones for the client. Any milestones that occur for the client while a milestone is being processed are batched into a single deferred milestone, which is dispatched as soon as the thread becomes available.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for deploying and managing software services, comprising:
   one or more microprocessors;
   a computing environment with a plurality of virtual machines running on one or more computing resources running on the one or more microprocessors, wherein the plurality of virtual machines are adapted to be deployed with services and applications; and
   a data consumer managing a plurality of observers including one or more virtual machine observers, one or more management observers, and a lumper observer,
   wherein each virtual machine observer is associated with at least one virtual machine in the computing environment and operates to extract performance data from the at least one virtual machine,
   wherein each management observer operates to collect performance data of an application server running on one or more virtual machines in the computing environment through a management server associated with the application server,
   wherein both the one or more virtual machine observers and the one or more management observers collect performance data based on an operation contract, wherein the operating contract includes one or more metric descriptors, each metric descriptor specifying one or more performance metrics describing the computing environment, and
   wherein the lumper observer operates to combine the performance data collected by the one or more virtual machine observers and the performance data collected by the one or more management observers.

2. The system according to claim 1, wherein:
   the data consumer is a controller.

3. The system according to claim 1, wherein:
   the operating contract also includes a collection of metric identifiers, wherein each metric identifier is associated with one metric descriptor.

4. The system according to claim 1, wherein:
   each data collector supports metrics with at least one of the following data types:

a base type;
a wrapper type; and
an aggregate type.

5. The system according to claim 1, wherein:
each said observer is accessed remotely.

6. The system according to claim 5, wherein:
the observers are nested into a hierarchy.

7. The system according to claim 5, wherein:
each said observer collects metrics in one of two ways: one-shot observation pattern and repeat observation pattern.

8. The system according to claim 1, wherein:
the data consumer accesses one of the observers using either a Pull model or a Push model.

9. The system according to claim 1, further comprising:
a push manager that allows the data consumer to register performance data items that need to be handled at periodic intervals, wherein the push manager calls the data consumer to process the performance data items at each time the periodic interval elapses.

10. The system according to claim 9, wherein:
the push manager allows one or more observers to register performance data items that need to be handled at periodic intervals, wherein the push manager calls one or more observers to push the performance data items at each time the periodic interval elapses to the data consumer for processing.

11. The system according to claim 9, wherein:
the push manager allows an agent observer to pull performance data from the lumper observer and push the performance data to the data consumer under a repeat observation pattern defined in the operation contract, and wherein the data consumer also operates to pull performance data from the agent observer under a one-shot observation pattern defined in the operation contract.

12. The system according to claim 1, wherein:
the lumper observer is associated with an observer context that is a collection of key/value pairs, wherein, when a request from the data consumer is received at the lumper observer, the lumper observer matches the observer context with provided context in the request and returns performance data that matches the observer context.

13. The system according to claim 1, wherein:
the data consumer operates to manage an agent observer that can combine the performance data collected by the lumper observer with the performance data collected by a resource pool observer.

14. A method for deploying and managing software services, comprising the steps of:
providing a computing environment with a plurality of virtual machines running on one or more computing resources running on one or more microprocessors, wherein the plurality of virtual machines are adapted to be deployed with services and applications;
providing a data consumer that manages a plurality of observers including one or more virtual machine observers and one or more management observers, wherein each virtual machine observer is associated with at least one virtual machine in the computing environment and operates to extract performance data from the at least one virtual machine, and wherein each management observer operates to collect performance data of an application server running on one or more virtual machines in the computing environment through a management server associated with the application server;
providing a lumper observer that operates to combine the performance data collected by the one or more virtual machine observers and the performance data collected by the one or more management observers; and
collecting performance data based on an operation contract, wherein the operating contract includes one or more metric descriptors, each metric descriptor specifying one or more performance metrics describing the computing environment.

15. A non-transitory machine readable medium having instructions stored thereon that when executed cause a system to:
provide a computing environment with a plurality of virtual machines running on one or more computing resources running on one or more microprocessors, wherein the plurality of virtual machines are adapted to be deployed with services and applications;
provide a data consumer that manages a plurality of observers including one or more virtual machine observers and one or more management observers, wherein each virtual machine observer is associated with at least one virtual machine in the computing environment and operates to extract performance data from the at least one virtual machine, and wherein each management observer operates to collect performance data of an application server running on one or more virtual machines in the computing environment through a management server associated with the application server;
provide a lumper observer that operates to combine the performance data collected by the one or more virtual machine observers and the performance data collected by the one or more management observers; and
collect performance data based on an operation contract, wherein the operating contract includes one or more metric descriptors, each metric descriptor specifying one or more performance metrics describing the computing environment.

* * * * *

UNITED STATES PATENT AND TRADEMARK OFFICE
CERTIFICATE OF CORRECTION

PATENT NO. : 8,239,526 B2  
APPLICATION NO. : 12/618571  
DATED : August 7, 2012  
INVENTOR(S) : Simpson et al.

Page 1 of 1

It is certified that error appears in the above-identified patent and that said Letters Patent is hereby corrected as shown below:

On the title page, in item [75], under "Inventors", line 1-2, delete "New Impswich" and insert -- New Ipswich --, therefor.

In column 18, line 15, delete "T1/I1C1," and insert -- (T1/I1C1, --, therefor.

In column 18, line 15, delete "2,v3)" and insert -- 2, v3) --, therefor.

Signed and Sealed this  
Sixth Day of November, 2012

David J. Kappos  
*Director of the United States Patent and Trademark Office*